United States Patent
Ota et al.

(10) Patent No.: US 6,702,676 B1
(45) Date of Patent: Mar. 9, 2004

(54) MESSAGE-CREATING GAME MACHINE AND MESSAGE-CREATING METHOD THEREFOR

(75) Inventors: Yoshihiko Ota, Kobe (JP); Yasuhiro Noguchi, Kobe (JP); Mitsuhiro Nomi, Kobe (JP)

(73) Assignee: Konami Co., Ltd., Tokyo-to (JP)

( * ) Notice: Subject to any disclaimer, the term of this patent is extended or adjusted under 35 U.S.C. 154(b) by 0 days.

(21) Appl. No.: 09/464,900

(22) Filed: Dec. 16, 1999

(30) Foreign Application Priority Data

Dec. 18, 1998 (JP) .......................................... 10-361690

(51) Int. Cl.$^7$ .......................... G06F 17/20; A63F 13/12
(52) U.S. Cl. ......................... 463/41; 463/37; 379/88.13
(58) Field of Search ............................... 463/1, 29–31, 463/35, 40–43; 379/67.1, 88.12, 88.13, 88.16, 88.17, 88.19, 93.13, 93.19, 93.23, 100.08, 209, 205, 913, 916, 908; 707/3–6, 10, 102; 345/473, 133, 703; 704/258, 260, 272; 341/28

(56) References Cited

U.S. PATENT DOCUMENTS 5,210,689 A * 5/1993 Baker et al. ................. 364/419
5,268,957 A * 12/1993 Albrecht ...................... 379/67

(List continued on next page.)

FOREIGN PATENT DOCUMENTS

| JP | 58068140 A | * | 4/1983 | .................. 341/28 |
| JP | 58-131857 | | 8/1983 | |
| JP | 59172033 A | * | 9/1984 | .................. 341/28 |
| JP | 62-160854 | | 7/1987 | |
| JP | 64-039160 | | 2/1989 | |
| JP | 09-252358 | | 9/1997 | |
| JP | 10-224520 | | 8/1998 | |

*Primary Examiner*—Mark Sager
*Assistant Examiner*—Steven Ashburn
(74) *Attorney, Agent, or Firm*—Jordan and Hamburg LLP

(57) ABSTRACT

A message-creating game machine includes at least one storage unit among a first storage unit for storing a plurality of images displaying character strings constituting sentences, a second storage unit for storing a plurality of images displaying character strings constituting words, and a third storage unit for storing a plurality of monosyllabic character images. The game machine also includes a display unit for displaying characters, a character-image-display control unit for displaying the character images stored in the storage unit on the display unit, a selecting unit for selecting at least one character image from among the character images displayed on the display unit, and a message-synthesizing unit for synthesizing a message from the selected character image.

22 Claims, 42 Drawing Sheets

U.S. PATENT DOCUMENTS

| | | | |
|---|---|---|---|
| 5,319,386 A * | 6/1994 | Gunn et al. | 345/173 |
| 5,343,386 A * | 8/1994 | Barber | 364/400 |
| 5,393,070 A * | 2/1995 | Best | 273/434 |
| 5,393,072 A * | 2/1995 | Best | 273/434 |
| 5,457,738 A * | 10/1995 | Sylvan | 379/96 |
| 5,568,539 A * | 10/1996 | Bergsman et al. | 379/67 |
| 5,596,634 A * | 1/1997 | Fernandez et al. | 379/201 |
| 5,673,256 A * | 9/1997 | Maine | 370/271 |
| 5,778,367 A * | 7/1998 | Wesinger, Jr. et al. | 707/10 |
| 5,828,732 A * | 10/1998 | Gow | 379/89 |
| 5,842,167 A * | 11/1998 | Miyatake et al. | 704/260 |
| 5,880,731 A * | 3/1999 | Liles et al. | 345/349 |
| 5,907,604 A * | 5/1999 | Hsu | 379/142 |
| 5,950,200 A * | 9/1999 | Sudai et al. | 707/9 |
| 5,952,942 A * | 9/1999 | Balakrishnan et al. | 341/20 |
| 5,963,217 A * | 10/1999 | Grayson et al. | 345/473 |
| 5,991,370 A * | 11/1999 | Ladd | 379/88.25 |
| 6,052,438 A * | 4/2000 | Wu et al. | 379/67.1 |
| 6,061,532 A * | 5/2000 | Bell | 396/661 |
| 6,061,681 A * | 5/2000 | Collins | 707/5 |
| 6,068,485 A * | 5/2000 | Linebarger et al. | 434/116 |
| 6,085,195 A * | 7/2000 | Hoyt et al. | 707/10 |
| 6,088,435 A * | 7/2000 | Barber et al. | 379/205 |
| 6,128,660 A * | 10/2000 | Grimm et al. | 709/227 |
| 6,203,433 B1 * | 3/2001 | Kume | 463/42 |
| 6,226,359 B1 * | 5/2001 | Montgomery et al. | 379/67.1 |
| 6,246,983 B1 * | 6/2001 | Zou et al. | 704/260 |
| 6,289,085 B1 * | 9/2001 | Miyashita et al. | 379/88.02 |
| 6,295,058 B1 * | 9/2001 | Hsu et al. | 345/339 |
| 6,327,343 B1 * | 12/2001 | Epstein et al. | 379/88.01 |
| 2002/0112005 A1 * | 8/2002 | Namias | 709/206 |

* cited by examiner

FIG. 6

ENTER RECIPIENT'S NAME

| | | | | | | | | |
|--|--|--|--|--|--|--|--|--|

| A | KA | SA | TA | NA | HA | MA | YA | RA | WA | a | tsu | " |
|---|----|----|----|----|----|----|----|----|----|---|-----|---|
| I | KI | SHI| CHI| NI | HI | MI |    | RI | O  | i | ya  | ° |
| U | KU | SU | TSU| NU | FU | MU | YU | RU | N  | u | yu  | & |
| E | KE | SE | TE | NE | HE | ME |    | RE | —  | e | yo  |   |
| O | KO | SO | TO | NO | HO | MO | YO | RO | ~  | o |     |   |

KATAKANA  SPACE ⇐ RETRY  CONFIRM

FIG. 7

ENTER RECIPIENT'S NAME

| | | | | | | | |
|---|---|---|---|---|---|---|---|

| A | KA | SA | TA | NA | HA | MA | YA | RA | WA | a | tsu | " |
|---|---|---|---|---|---|---|---|---|---|---|---|---|
| I | KI | SHI | CHI | NI | HI | MI | | RI | O | i | ya | ° |
| U | KU | SU | TSU | NU | FU | MU | YU | RU | N | u | yu | & |
| E | KE | SE | TE | NE | HE | ME | | RE | — | e | yo | |
| O | KO | SO | TO | NO | HO | MO | YO | RO | ~ | o | | |

KATAKANA  SPACE  ⇐  RETRY  CONFIRM

FIG. 15

ENTER PROFILE

| SEX | MALE | FEMALE | OTHER |
| --- | --- | --- | --- |
| AGE | ⇐ 19 YEARS ⇒ | | |
| JOB | SERIOUS STUDENT | LAZY STUDENT | SERIOUS ADULT | LAZY ADULT |
| HOBBY | NATURE-RELATED | SPORTS-RELATED | LIKES TO WANDER THE STREETS | INDOOR TYPE |
| BLOOD TYPE | A | B | AB | O |

CONFIRM

FIG. 20

CONFIRMATION

| | | | | | か | お | り |

| FEMALE | 19 YEARS OLD | LAZY STUDENT | LIKE TO WANDER THE STREETS | AB |

| 0 | 1 | 0 | 1 | 2 | 3 | 5 | 6 | 8 | 7 | 4 | |

| I AM A | ACTUALLY-YOUNGER | KARAOKE-LOVING | GIRL |

I'M IN PEAK FORM TO TAKE ON ANYTHING.

CORRECTION — CORRECT NAME · CORRECT PROFILE · CORRECT TELEPHONE NUMBER · CORRECT PROPOSING MESSAGE · CONFIRM

MESSAGE-CREATING GAME MACHINE AND MESSAGE-CREATING METHOD THEREFOR

BACKGROUND OF THE INVENTION

1. Field of the Invention

The present invention relates to a message-creating game machine that combines predetermined characters or strings of characters to create a message and that uses a (wired or wireless) telephone link to transmit the message to a receiver, and to a message-creating method therefor.

2. Description of the Related Art

Game machines are known in which the fifty characters of the Japanese syllabary are displayed in ten rows of five sounds on a monitor screen. A game player successively selects characters from among the displayed characters to create the name and address of the player, and the game machines print out a sheet on which a plurality of seals, each having the created name and address, are printed.

In game machines of this type, from among characters being displayed, some characters are selected and simply displayed in the order of selection. The selected characters are printed on a seal having a predetermined format such as a name field and an address field, and no message is composed. The known game machines have only a printout function and no function of transmission to another game player.

SUMMARY OF THE INVENTION

Accordingly, it is an object of the present invention to provide a message-creating game machine that creates a message by effectively combining sentences, words, and characters, and that transmits the created message to a specified receiver via a telephone link, and to provide a message-creating method therefor.

To this end, according to an aspect of the present invention, the foregoing object is achieved through provision of a message-creating game machine including: a storage unit including at least one storage unit among a first storage unit for storing a plurality of images displaying character strings constituting sentences; a second storage unit for storing a plurality of images displaying character strings constituting words; and a third storage unit for storing a plurality of monosyllabic character images; a display unit for displaying characters; a character-image-display control unit for displaying the character images stored in the storage unit on the display unit; a selecting unit for selecting at least one character image from among the character images displayed on the display unit; and a message-synthesizing unit for synthesizing a message from the selected character image.

Preferably, the message-synthesizing unit performs audio synthesizing to compose the message in the form of audio signals.

The first storage unit may store sentences so that the sentences have a plurality of parlance patterns, and the message-synthesizing unit may perform the audio synthesizing after selecting any one parlance pattern from among the plurality of parlance patterns.

The message-creating game machine may further include: a game-element display-control unit for displaying a plurality of game elements on the display unit; and a game-element selecting unit for selecting a game element from among the game elements displayed on the display unit. The message-synthesizing unit may perform audio synthesizing by unit of the parlance pattern corresponding to the selected game element.

The message-creating game machine may further include a data storage unit for storing created messages so that the created messages can be read.

The message-creating game machine may further include a communication control unit and a telephone unit including at least an operation unit. The character-image-display control unit may display a telephone-number entering screen. The communication control unit sends a call to a telephone number entered from the operation unit, and the message-synthesizing unit outputs the synthesized message to the telephone unit.

The message-creating game machine may further include a time-measuring unit and a transmission-time designating unit. The communication control unit may perform a calling process at a time designated by the transmission-time designating unit.

The message-creating game machine may further include: an identification-information storage unit for storing identification information assigned to the entirety of the message-creating game machine; and an identification-information adding unit for adding the identification information to a message to be transmitted.

The message-creating game machine may further include a communication-disabling unit for disabling calling to a specified telephone number.

According to another aspect of the present invention, the foregoing object is achieved through provision of a message-creating method using a storage unit including at least one storage unit among a first storage unit for storing a plurality of images displaying character strings constituting sentences; a second storage unit for storing a plurality of images displaying character strings constituting words; and a third storage unit for storing a plurality of monosyllabic character images. The message-creating method includes the steps of: displaying the monosyllabic character images on a display unit; selecting at least one image from among the displayed monosyllabic character images; and using the selected image to synthesize a message.

Preferably, the message is formed in the form of audio signals by performing audio synthesizing.

The first storage unit may store sentences so that the sentences have a plurality of parlance patterns, and audio synthesizing may be performed after selecting any one of the parlance patterns.

The plural different type game elements may be displayed on the display unit. By selecting one game element from among the displayed game elements, the audio synthesizing may be performed using the parlance pattern corresponding to the selected game element.

The created messages may be stored in a data storage unit so as to be read.

The message-creating method may further use a telephone means, whereby a call is sent to an entered telephone number and the synthesized message is transmitted from the telephone means to a receiver.

In the message-creating method, with a time measured, a calling process may be performed when the measured time reaches a designated transmission time.

In the message-creating method, with identification information assigned to a message-creating game machine, the identification information may be added to a message to be transmitted.

In the message-creating method, calling to a specified telephone number may be disabled.

According to the present invention, selected character strings and monosyllabic characters are automatically combined to synthesize a message. This can provide a game in which message creation is easily performed.

A message can be directly transmitted as sound to a recipient's telephone.

A character-selecting operation by the player can be facilitated.

Reproduction can be performed when required, and a highly applicable multi-purpose game can be provided.

An interesting game in which the player can transmit the message without talking by telephone can be provided. Identification information is added to a message. This enables a recipient who received a message to know the place of a game machine having transmitted the message and to preferably and easily check the profile of a person who sent the message.

In addition, it is possible to securely prevent the present game from being applied by mistake or for fun.

BRIEF DESCRIPTION OF THE DRAWINGS

FIG. 6 is an illustration of a recipient's name entering screen which includes an illustration of a phonetic notation corresponding to a Japanese syllabary:

FIG. 7 is an illustration of a player's name entering screen;

FIG. 15 is an illustration of a profile-entering screen;

FIG. 20 is an illustration of a set profile confirming screen;

DESCRIPTION OF THE PREFERRED EMBODIMENTS

Figure 1:
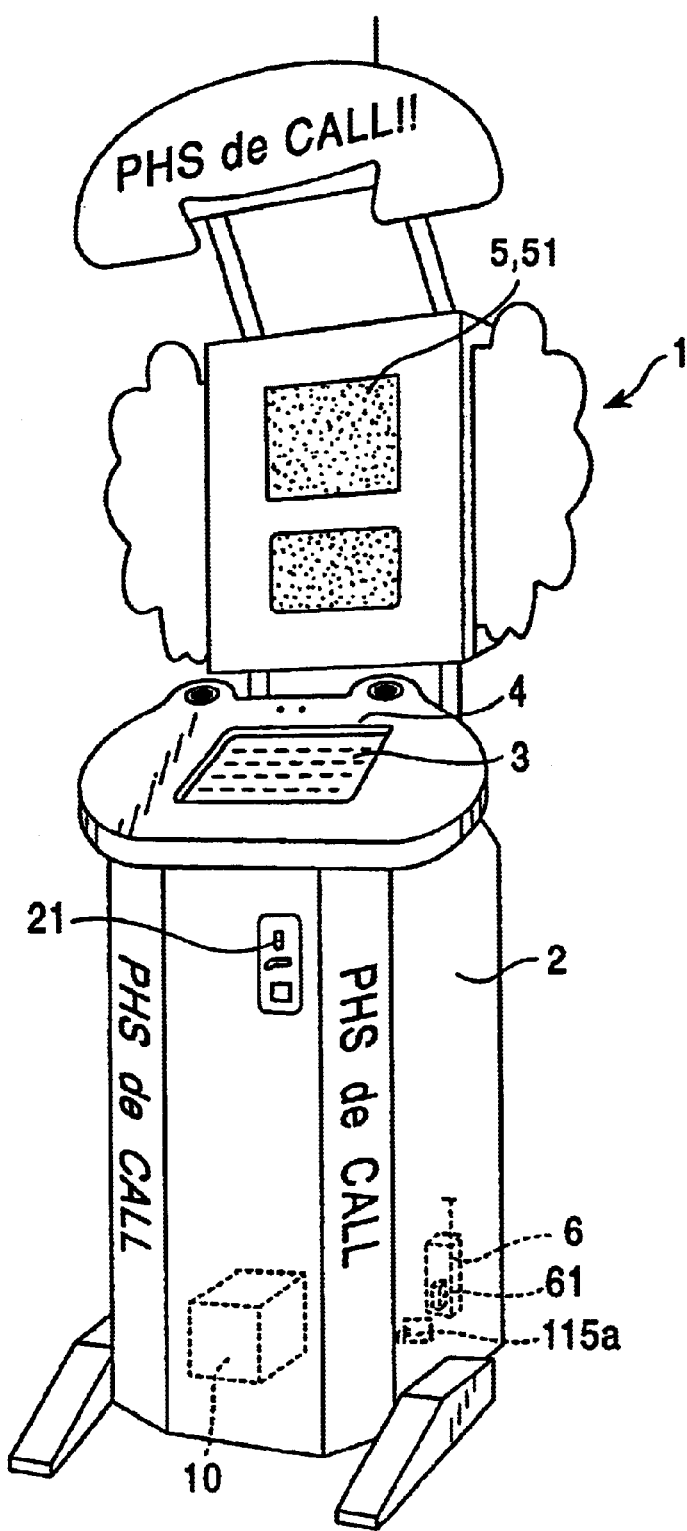
FIG. 1 is an exterior view showing a game machine 1 according to an embodiment of the present invention.
Figure 2:
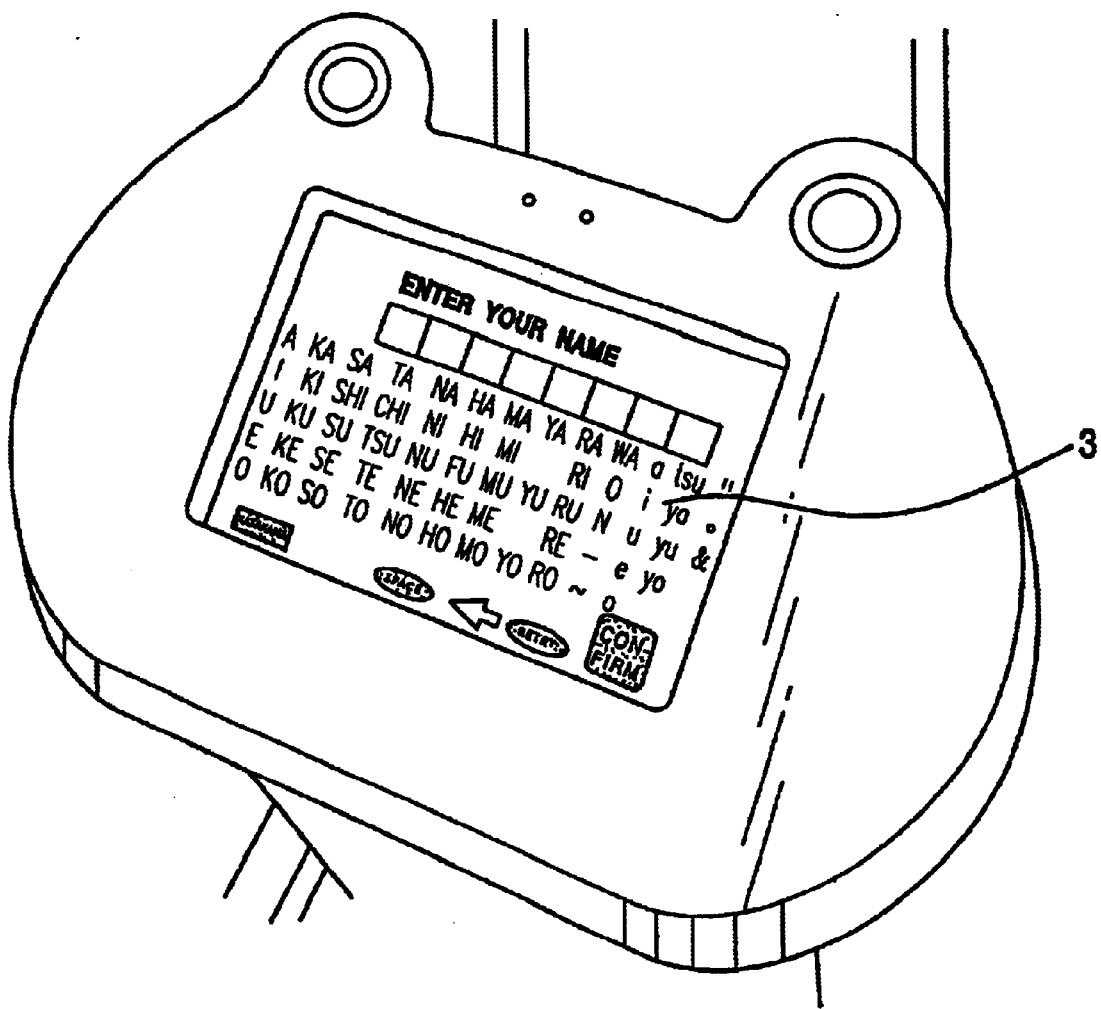
FIG. 2 is an illustration of a game screen displayed on a monitor.

FIG. 1 shows the exterior of a message-creating game machine 1 according to an embodiment of the present invention, and FIG. 2 shows an example of an on-monitor game screen. The message-creating game machine 1 includes a housing 2, a monitor 3 provided in the upper part of the housing 2, a tablet 4 as an operation unit for receiving operations from a game player, an image-capture unit 5 provided above the housing 2, and a telephone unit 6 (indicated by a dotted line in FIG. 1) provided in the housing 2.

The housing 2 has the monitor 3 at a height corresponding to the position of the waist of the player, whereby ease of operations on the monitor 3 is provided. A coin slot 31 is provided on the front of the housing 2. In the coin path of the coin slot 31 to the inside of the housing 2, a coin detector (shown in FIG. 3) is provided that detects an inserted coin and determines whether the coin is real or false. The housing 2 includes a built-in controller 10 (indicated by a dotted line in FIG. 1) including various circuit units for controlling a game played on the game machine 1.

The monitor 3 is provided so that its display panel is slightly inclined to the horizontal plane and so that its display panel displays various game screens (described below). FIG. 2 shows, as one of the game screens, an input screen for designating monosyllabic characters. The tablet 4 is used to designate a position, and is overlaid in the form of a thin layer on the display panel of the monitor 3. The tablet 4 is transparent or translucent, and is formed so that displayed contents on the display panel can be adequately viewed. The tablet 4 has a resin-molded structure including a matrix of resistance wires and an electrically conductive layer with a minute spacing provided from the matrix. Touching the surface of the tablet 4 with a finger brings the conductive layer and the matrix of resistance wires into contact with each other, whereby a voltage corresponding to the position of contact can be detected as a coordinate position. A type of tablet using a piezoelectric material or ultrasound as a touched position detector may be employed.

The image-capture unit 5 is provided at a height almost corresponding to the position of the player, and has a planar front, a mirror (or a mirror-like plate) provided at nearly the center of the front, and the image-capture lens unit of a camera 51 provided so as to have a front view. In FIG. 1, only a transparent cover for the image-capture lens unit is shown. The camera 51 may be of a type employing a general silver-halide photographic system. However, for successive image capture and digital image processing on captured images, the camera 51 is of a type in which a digital image-capture unit having a matrix of charge-coupled devices is preferably provided at an image forming position determined by an image-capture lens. The image-capture unit 5 can repeatedly perform image capturing at predetermined intervals, thereby providing an advantage in that a moving picture can be displayed on the monitor 3. By using the image-capture unit 5, the image of the face of the player at a capture-instructing timing may be temporarily acquired in a random access memory (RAM) 102. Beneath the mirror, there is provided an output speaker for sound effects or necessary audio guidance.

The type of the telephone unit 6 includes not only an ordinary telephone system but also a mobile telephone system (including a personal handyphone system (PHS)), and a telephone system capable of transmitting character data. In this embodiment, a communication modem is employed as the telephone unit 6. In the telephone unit 6, the modem includes a communication controller 62 (shown in FIG. 3). The communication controller 62 uses a radio link including a public circuit and relay stations to perform control so as to establish communication with a receiver.

Figure 3:
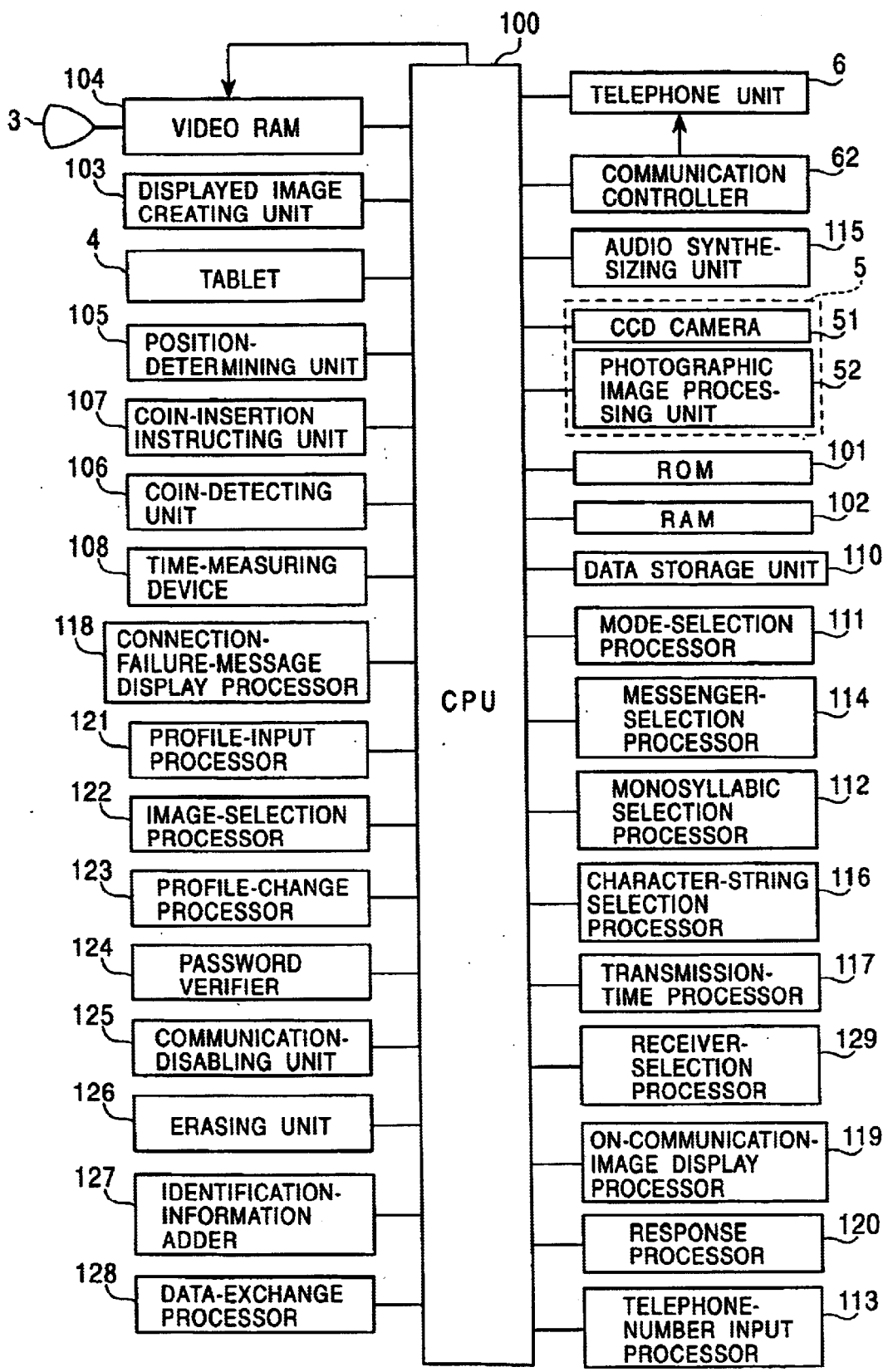
FIG. 3 is a block diagram showing the game machine 1 shown in FIG. 1.

FIG. 3 shows the structure of the game machine which is obtained when the controller 10, which includes microcomputers, is centered. Specifically, the controller 10 includes a central processing unit (CPU) 100, a read-only memory (ROM) 101 for storing the program of the video game and various game screens to be displayed on the monitor 3, and a RAM 102 for temporarily storing data being processed. The ROM 101 includes a character-string storage unit for storing the images of character strings constituting sentences, a word storage unit for storing the images of character strings constituting words, and a monosyllabic storage unit for storing the images of monosyllabic characters. The ROM 101 includes a storage unit for storing the telephone numbers of police stations, fire stations, and other public facilities. When the player mistakenly designates these telephone numbers, a communication-disabling unit 125 disables the designation or call origination. The ROM 101 also includes an identification-information storage unit for storing identification information for specifying the video game machine 1.

Figure 26:
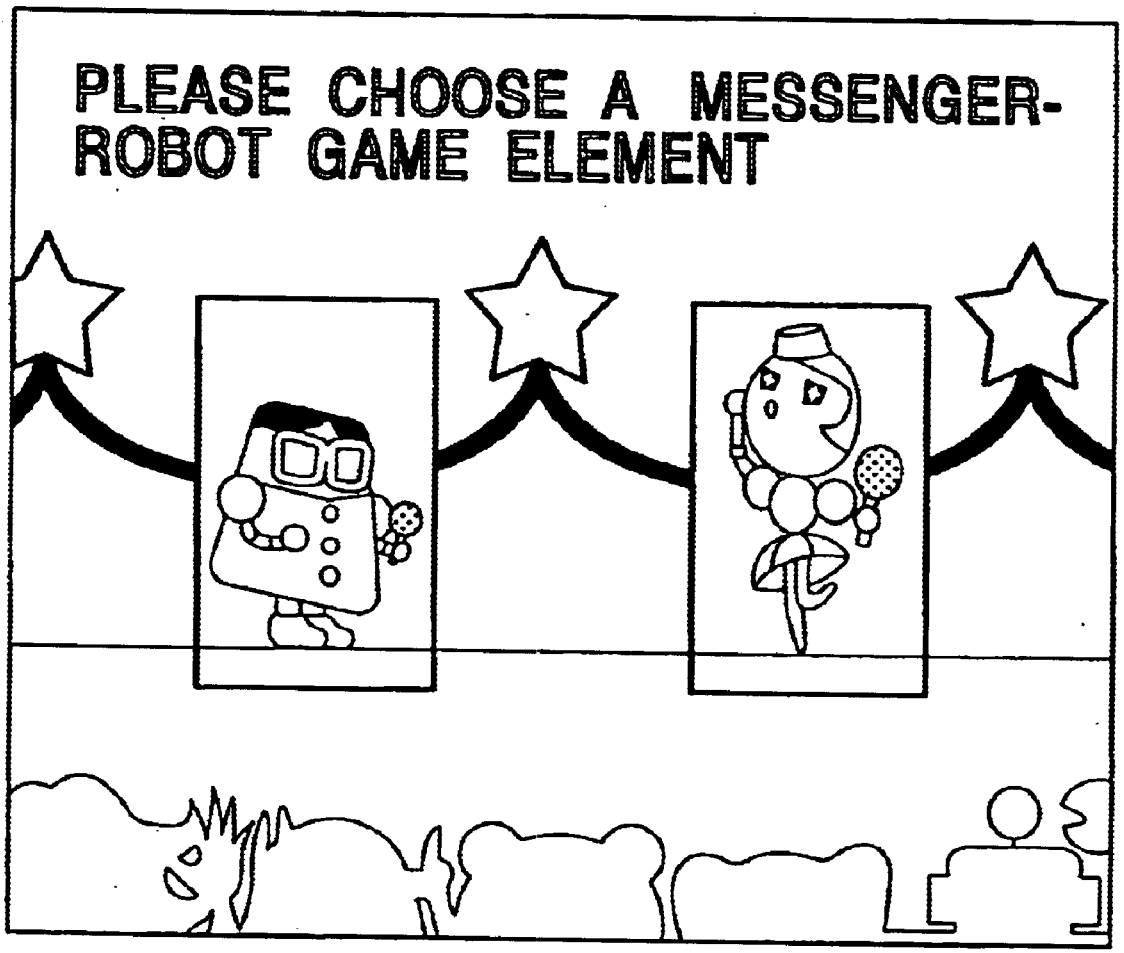
FIG. 26 is an illustration of a game screen for selecting either male or female messenger-robot game elements.

Audio signals for different parlance patterns corresponding to messenger game elements (described below) shown in FIG. 10 and for messenger-robot game elements shown in FIG. 26 are modulated into audio waveforms matching the parlance patterns by an audio synthesizing unit 115.

A displayed image creating unit 103 creates and edits, in accordance with the game program, game screens (characters, game elements, icons, and portraits) based on the contents of operations by the player, and successively displays the screens on the monitor 3. Images of at least one screen, created by the displayed image creating unit 103, are temporarily written in a video RAM 104. The images are read in each predetermined interval (one-sixth of a second) from the video RAM 104 so that a still picture is displayed on the monitor 3. The displayed image creating unit 103 also executes a switching process for displaying the contents of the next screen or the previous screen when an arrow icon, displayed on the monitor 3, is designated.

A position-determining unit 105 specifies a touched image, that is, a designated image, based on a display region for each image to be designated, such as a character, a game element, and an icon which is displayed on the monitor 3 and which is included in a game screen, and on the coordinates of a position at which the player touched the tablet 4. A coin-detecting unit 106 detects the insertion of a required number of coins from a coin slot 21. A coin-insertion instructing unit 107 displays, on the monitor 3, an instruction for requesting additional coins when a time-measuring device 108 has measured a predetermined game time from the start of the game, or in accordance with the progress of the game. The coin-insertion instructing unit 107 may perform audio guidance with the speaker. The time-measuring device 108 has timer functions and measures days, hours, and minutes. Regarding time measurement from the start of the game, a timer specialized for that purpose may be provided.

A photographic image processing unit 52 performs a process for using the image-capturing unit 5 to perform image capturing a predetermined number of times (e.g., three times), and creates image data by performing analog-to-digital conversion on captured picture signals from the charge-coupled devices (CCDs). The photographic image processing unit 52 also sends the created data of three images to the video RAM 104 via the displayed image creating unit 103. In the case where the image-capture unit 5 can capture color images, it creates image data corresponding to red, green, and blue, and includes built-in storage units for the colors that store the image data so that the colors are readable. In this case, the video RAM 104 needs to be provided for each color.

The contents of the video game are briefly described below with reference to FIGS. 4 to 35.

Figure 4:
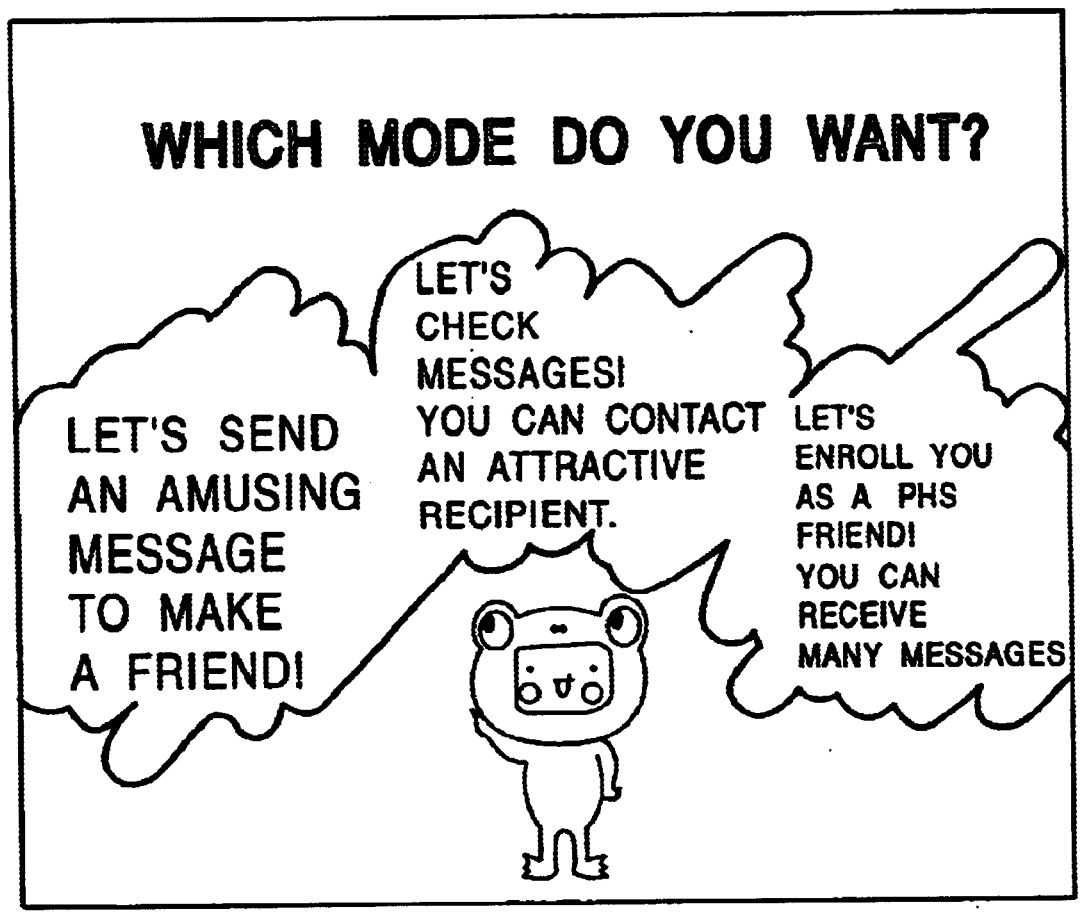
FIG. 4 is an illustration of a mode-selecting screen.

In this game, the mode-selecting screen shown in FIG. 4 is displayed as an initial screen. The mode-selecting screen displays the modes entitled: "LET'S SEND AN AMUSING MESSAGE FOR MAKING A FRIEND" (hereinafter referred to as the "To-Friend Sending Mode"); "LET'S CHECK MANY MESSAGES! YOU CAN CONTACT AN ATTRACTIVE RECIPIENT" (hereinafter referred to as the "Check Mode"); and "LET'S ENROLL YOU AS A PHS FRIEND! YOU CAN RECEIVE MANY MESSAGES"

(hereinafter referred to as the "Enrolling Mode") so that one of the modes can be selected. In the Enrolling Mode, the game screen displayed on the monitor 5 is transferred to that shown in FIG. 5, and an option (hereinafter referred to as the "Enrollee Check Mode") asking the player whether the player checks enrollees, and an option (hereinafter referred to as the "Mailbox Check Mode") asking the player whether the player wishes to check the mailbox, are displayed so that one option can be selected.

In the To-Friend Sending Mode, the game screens shown in FIGS. 6 to 13 are sequentially displayed. The game screens enable the player to compose a message and to call a friend at a designated time to say the composed message with a predetermined parlance pattern.

In the Enrolling Mode, the game screens shown in FIGS. 14 to 22 are sequentially displayed. Information such as the contents (profile) for self-introduction of the player, a telephone number, a portrait, and a password, are stored in an internal data storage unit 110, with the information and the password related to each other, whereby the player information is recorded in the game machine 1. Among the storage contents in the data storage unit 110, the telephone number is stored with a display-disabling flag added to it, whereby the telephone number is not completely displayed on the monitor 3 to a person other than the player by using, as a condition, the matching of the player's password, as described below. The data of each enrollee, stored in the data storage unit 110, are managed in a period by the time-measuring device 108. When a predetermined period, e.g., a month, has passed from the date of storage, the data of each enrollee are automatically erased by an erasing unit 126.

Figure 23:
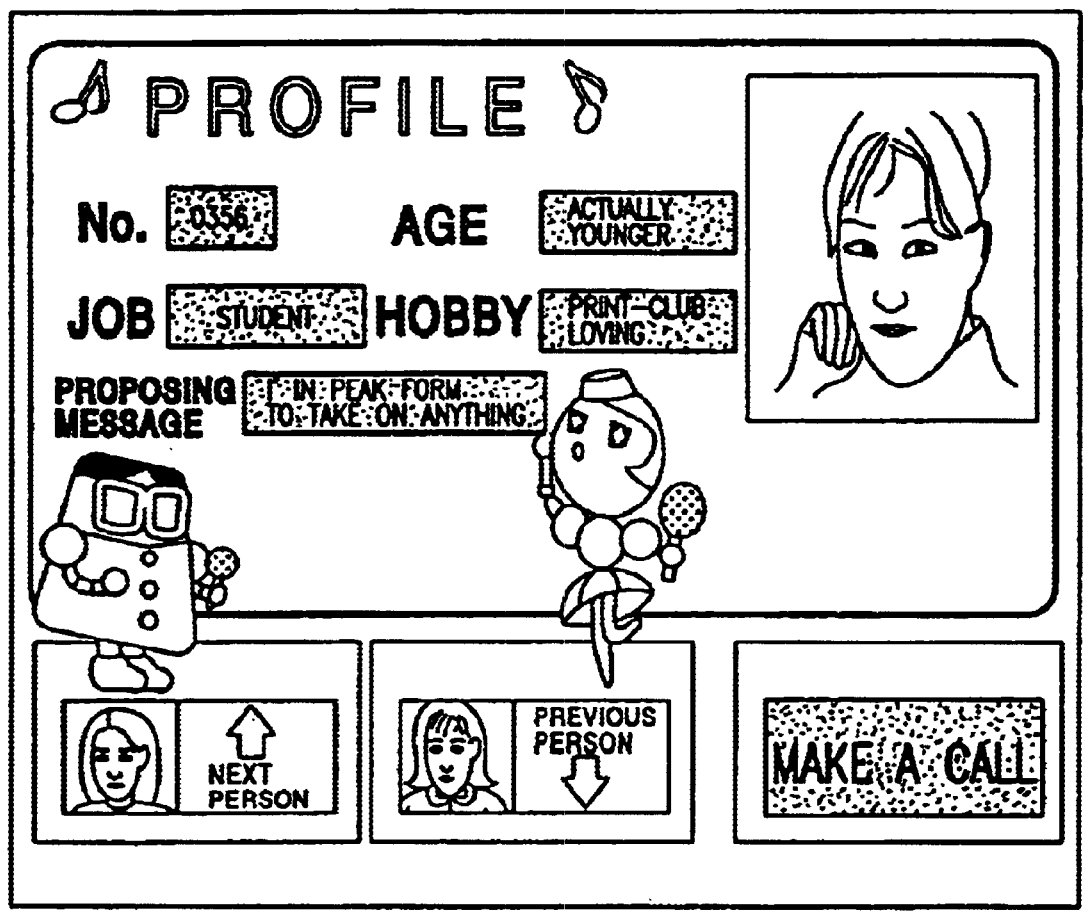
FIG. 23 is an illustration of an enrollee list display screen.
Figure 24:
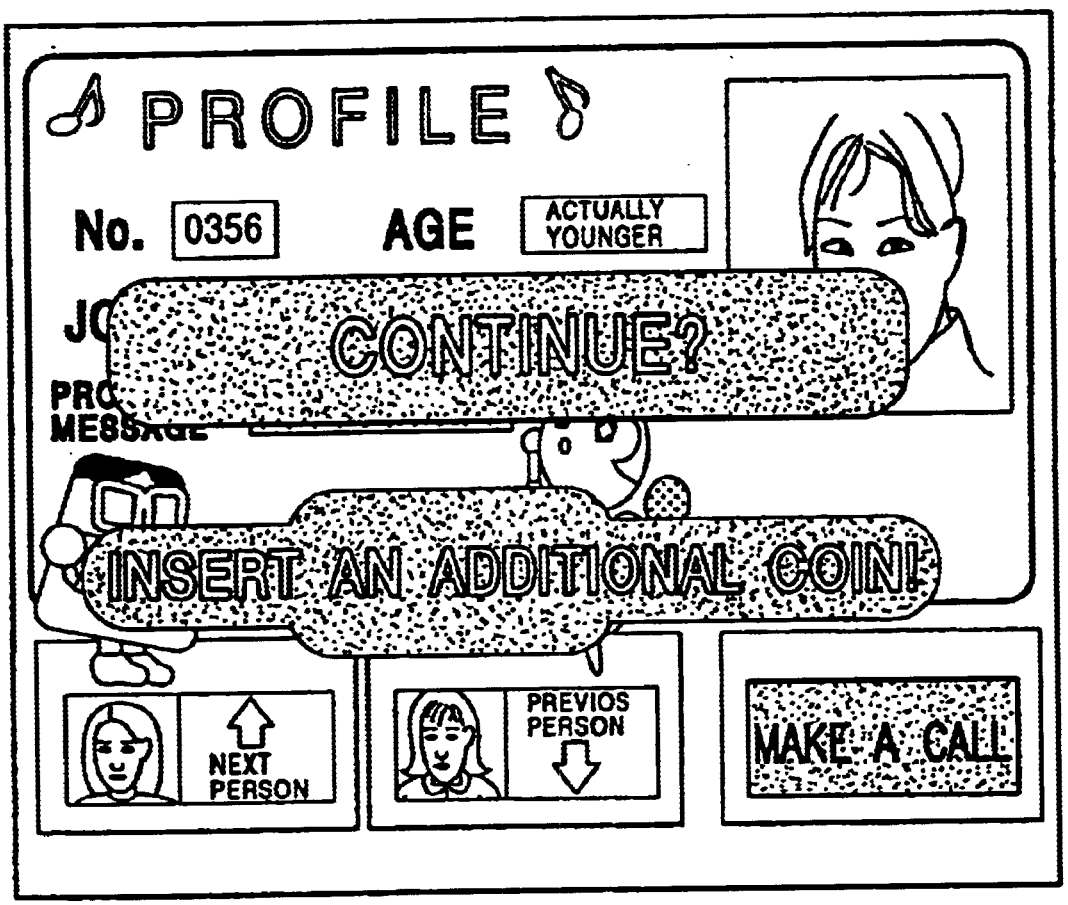
FIG. 24 is an illustration of a game screen for inquiring about the continuation of checking in the display of an enrollee list.
Figure 25:
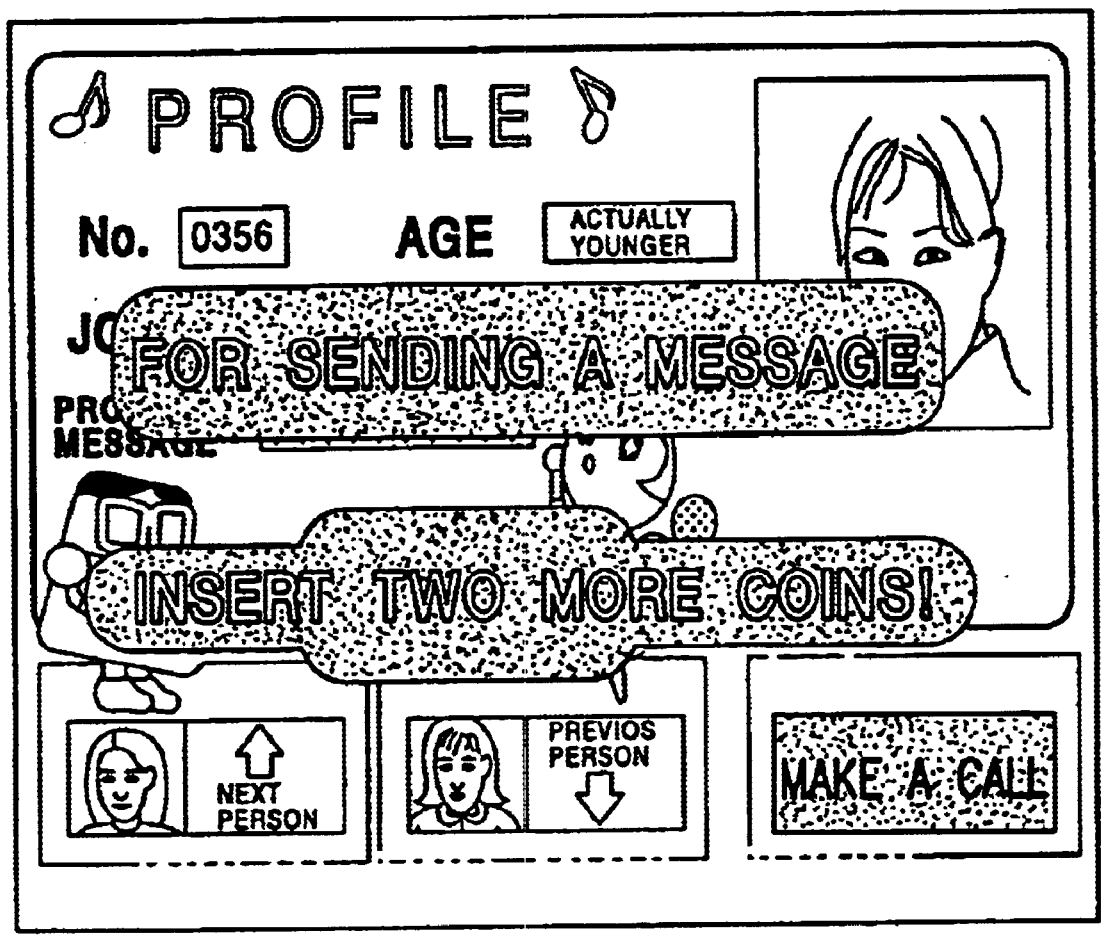
FIG. 25 is an illustration of a game screen for instructing message transmission when an enrollee list is displayed.

In the Enrollee Check Mode in the Check Mode, the game screens shown in FIGS. 23 to 25 are sequentially displayed. Accordingly, in the case where the player has already been recorded in the game machine 1, the player can check and search a list of the profiles of the enrollees recorded in the game machine 1, and can send a message to the desired enrollee as a recipient since the game screens shown in FIGS. 26 to 30 are sequentially displayed. In the case where a player who has not been recorded yet in the game machine 1 plays the game, the player is allowed to check the list of the profiles of the enrollees, but must satisfy the condition that the player information is recorded in the game machine 1 in accordance with the same process as in the Check Mode.

In the Mailbox Check Mode in the Check Mode, the game screens shown in FIGS. 31 to 35 are sequentially displayed. The player checks the player's mailbox named "Box" by entering the correct password, and is allowed to find a message record in the mailbox in the case where telephone communication was unsuccessful, in other words, the player failed to answer the telephone when messages were sent from other enrollees. The player is also allowed to send a response message to the desired recipient among the enrollees. In this case, the player can change the player's profile, as required.

Referring back to FIG. 3, a mode-selection processor 111 selects a mode from among the To-Friend Sending Mode, the Check Mode, the Enrolling Mode, the Enrollee Check Mode, and the Mailbox Check Mode. A monosyllabic selection processor 112 successively displays, in the upper name-entering fields shown in FIGS. 6 and 7, an arrangement of phonetic expressions (using the English alphabet) corresponding to a Japanese syllabary. Note that the phonetic expressions shown in FIG. 6 is not 100% correct as a sound of Japanese syllabary cannot perfectly be reproduced using the alphabet. But FIG. 6 is provided to give a close pronunciation (sound) for respective Japanese syllabary for those who can not read Japanese characters. It should also be noted that it would be possible to replace the arrangement of 50 letters of Japanese syllabary shown in FIG. 6 with twenty-six alphabet letters, "A, B, C, D, E, F, G, . . . , X, Y, Z" especially when this game machine is to be used in English speaking countries.

Referring to the Japanese icons represented by the phonetic expression, shown in FIG. 6, the icon "KATAKANA (Japanese syllabary)" is used to switch the Japanese syllabary of Hiragana type to the Japanese syllabary of the katakana type; the icon "SPACE" is used to insert a space between a family name and a given name; the icon "RETRY" means correction; and the icon "CONFIRM" means that the entered information is confirmed to be correct. A telephone-number input processor 113 sequentially displays each designated numeral in the upper telephone-number entering fields shown in FIGS. 8 and 9 whenever a position of the ten-key pad (shown in FIGS. 8 and 9), which indicates a numeral, is touched.

Figure 10:
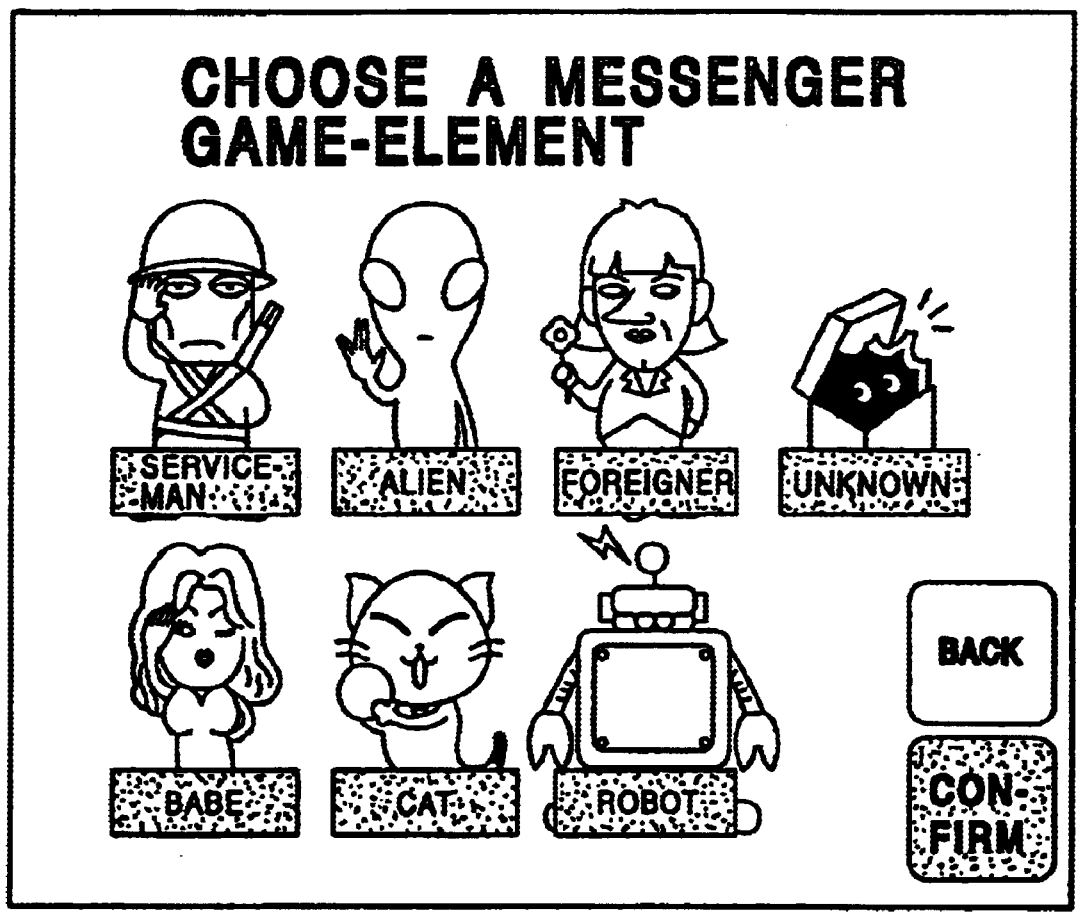
FIG. 10 is an illustration of a messenger-game-element selecting screen.

A messenger-selection processor 114 selects one of the messenger game-elements shown in FIG. 10, and selects one of the messenger-robot game elements shown in FIG. 26. The audio synthesizing unit 115 includes a processor for implementing waveform processing on the composed message so as to have a parlance pattern corresponding to the messenger or messenger-robot game-element selected by the messenger-selection processor 114. The messenger-selection processor 114 converts the composed message into audio signals representing the parlance pattern in accordance with the selected game element. The audio signals obtained by audio synthesizing are output to a small speaker 115a opposite the microphone of the telephone unit 6. For transmitting a message to a character-transmittable telephone unit, character codes or character data may be directly transmitted. In this case, the audio synthesizing unit 115 does not always need to be used.

Figure 11:
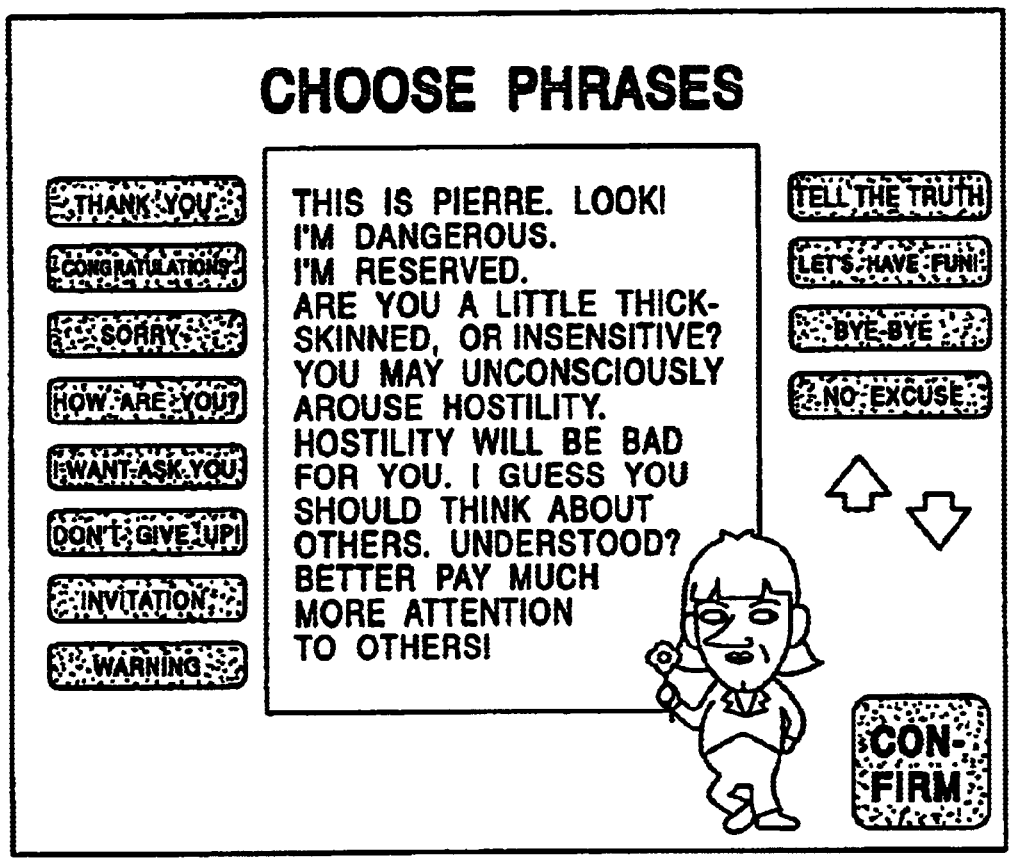
FIG. 11 is an illustration of a prepared message selecting screen.
Figure 30:
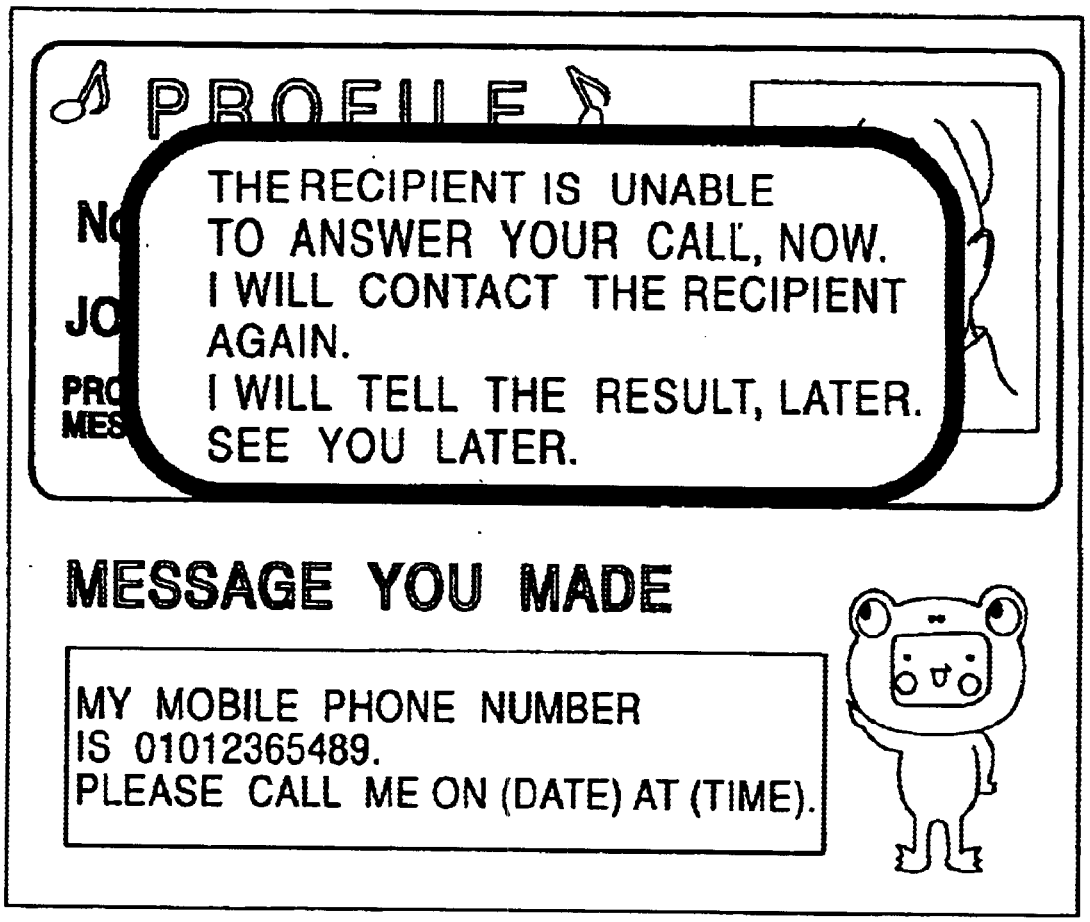
FIG. 30 is an illustration of a game screen displaying communication failure.

A character-string selection processor 116 executes processing for selecting one of the prepared messages shown in FIG. 11 and for creating a message by using (connecting) sentences and words selected from the sentences and words (shown in FIG. 27) to be combined for a massage. A transmission-time processor 117 uses the timetable (shown in FIG. 12) to designate a message-transmitting time, and instructs transmission while monitoring the time measured by the time-measuring device 108. The transmission-time processor 117 performs control so that when the telephone unit 6 has already been used, the telephone unit 6 sends a call just after the use of the telephone unit 6. In addition, according to the present invention, when a recipient was unable to answer the call, and also when the power of a mobile phone was switched off, or the mobile phone was located out of communication range, the game machine 1 is designed to send a call again after a predetermined time, as shown in FIG. 30, and the transmission-time processor 117 also manages re-calling after the predetermined time. In such a case, a connection-failure-message display processor 118 displays, for the player, the fact that no connection was made by telephone.

An on-communication-image display processor 119 displays, on the monitor 3, an enrollee's profile and the contents of a message made by the player. A response processor 120 recognizes the contents of a recipient Is response to the message transmitted by the player, and controls the game screen being displayed to reflect the contents of the response. For example, the response processor 120 performs image processing for changing (deforming) the image of the recipient's face into the expression of a smile when the player affirmatively responds to the response message (e.g., the player touches the touch button "1"), and performs image processing for changing (deforming) the image of the recipient's expression into one of unease in the converse case (e.g., the player touches the touch button "0").

Figure 22:
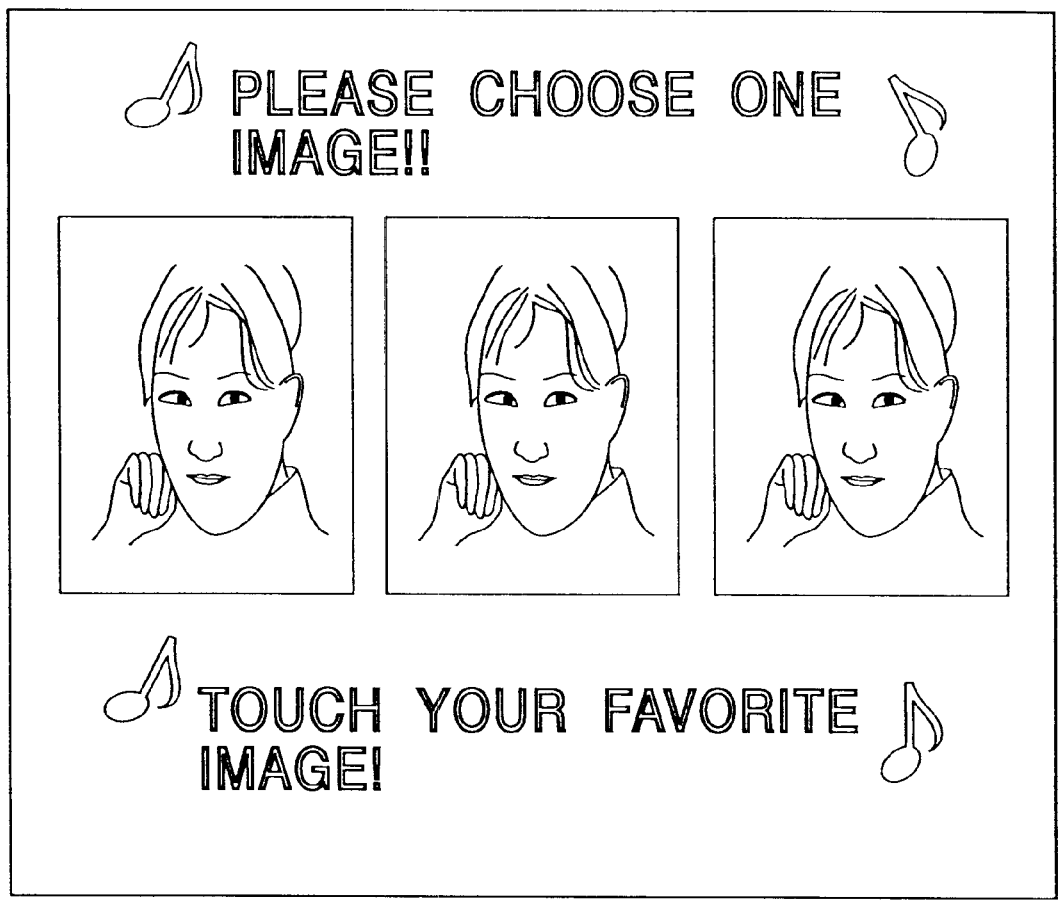
FIG. 22 is an illustration of an image-selecting screen.

A profile-input processor 121 displays each menu selected in the making of the player'S s profile, in the corresponding field. A image-selection processor 122 performs image capturing three times, as shown in FIG. 22, and performs processing for the case where the desired photograph is selected from among the three photographs displayed on the monitor 3. The image-selection processor 122 stores the selected photographic image in the data storage unit 110 so as to be correlated to the corresponding profile. A profile-change processor 123 prompts the player to change the profile, and displays, when the player changes the profile, only a menu to be changed so that the desired change can be performed.

A password verifier 124 performs processes using the condition that the player enters a password, and determines whether the entered password coincides with one of the recorded passwords. The password verifier 124 maintains security by verifying whether a person has been enrolled when the person checks the list of the enrollees, or by blocking any person excluded from being an enrolled person from checking the list of the enrollees.

In order to inform a recipient that the game machine 1 is a transmitter, an identification-information adder 127 adds identification information to the beginning and end of a message to be transmitted, by performing, for example, audio synthesizing to audio information. It is preferable that the identification information be on the installation place of the game machine 1, a place name, etc. This enables a recipient to know which game machine transmitted a message and to use a video game machine to check the profile of the person who transmitted the message.

A receiver-selection processor 129 performs processing for the case where the desired enrollee is designated from the list of the enrollees displayed on the monitor 3 when a message is sent to an enrollee.

The process of the game played in the above-described construction is described below.

FIGS. 36 to 41 are flowcharts illustrating the process of the game.

Figure 5:
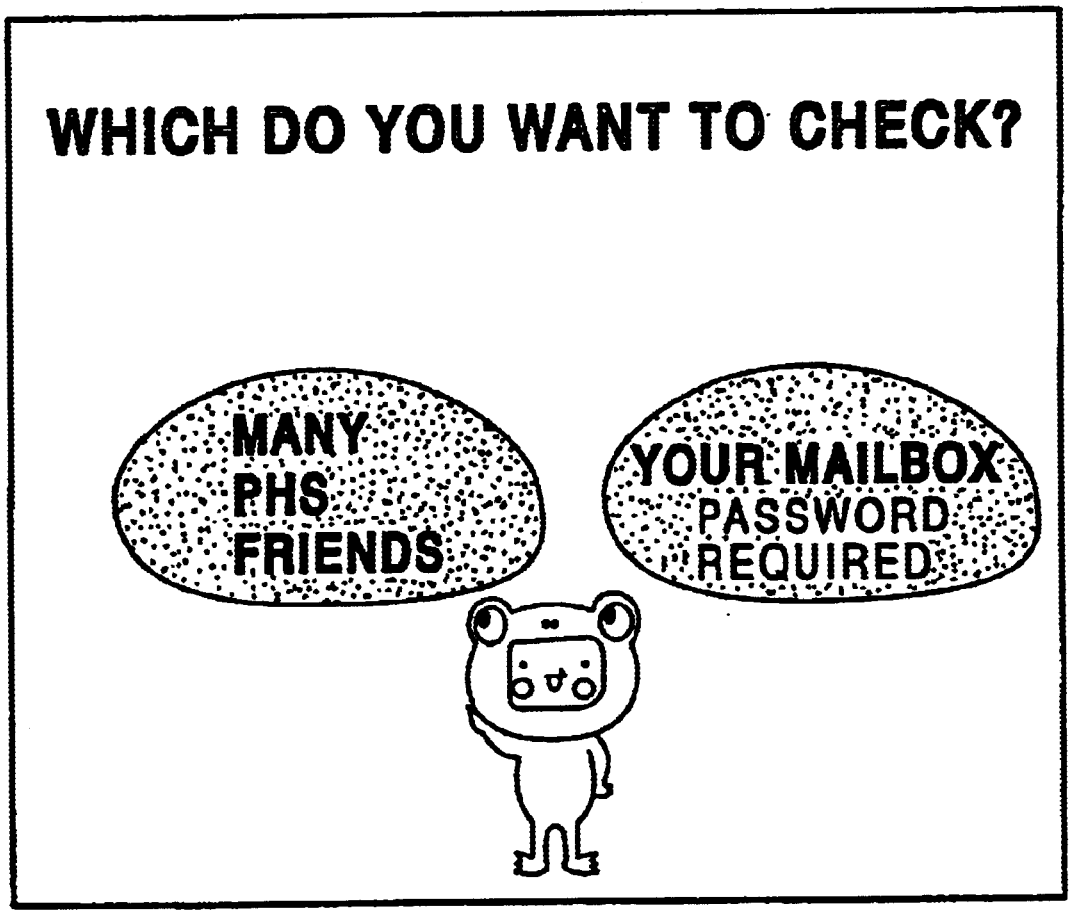
FIG. 5 is an illustration of a mode-selecting screen.
Figure 36:
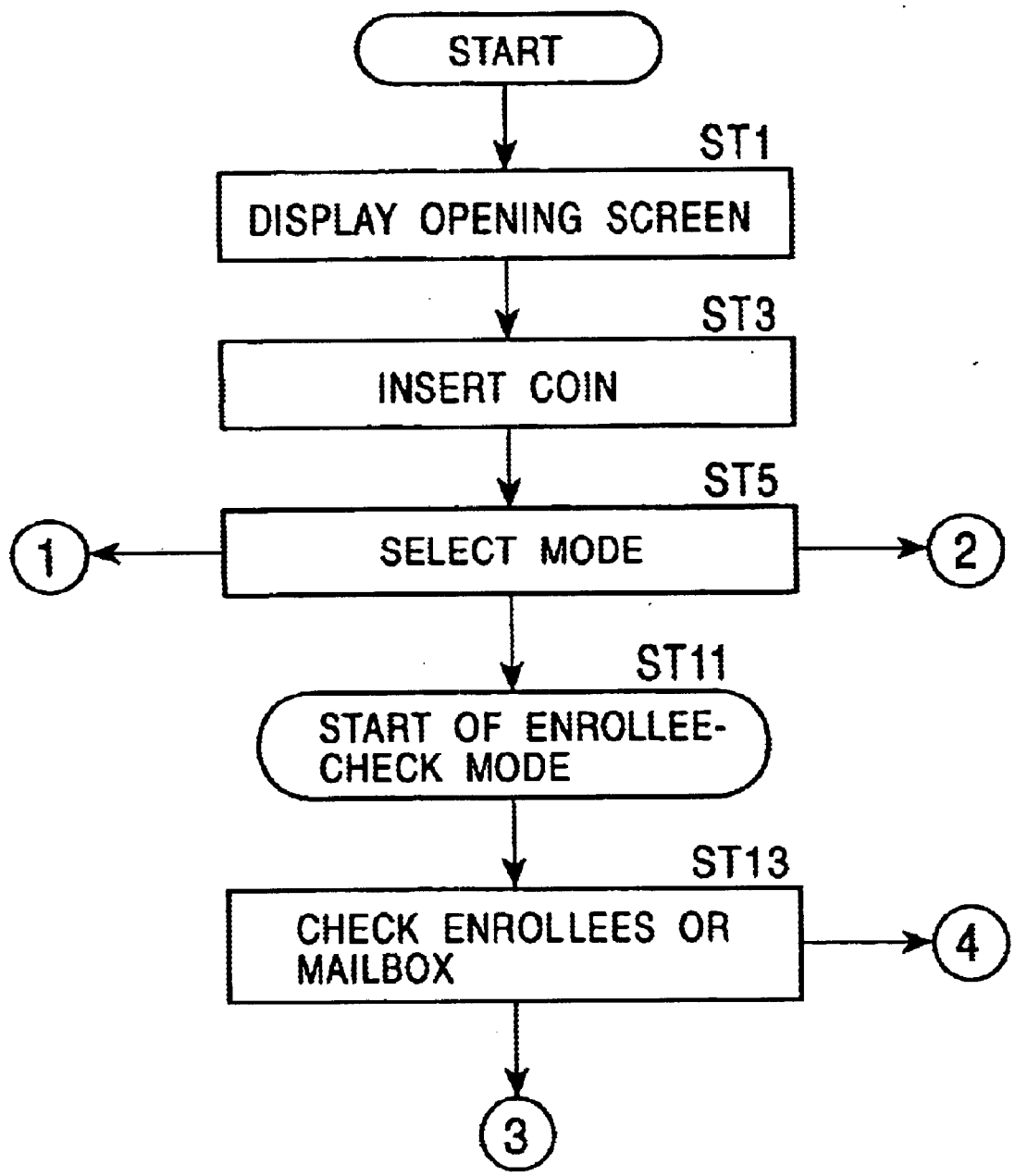
FIG. 36 is a flowchart illustrating mode selection.

In the flowchart shown in FIG. 36, the supply of power to the game machine 1 displays a predetermined opening game screen (step ST1). When the coin-detecting unit 106 has detected the insertion of a coin (e.g., a ¥ 100 coin) (step ST3), the opening game screen is switched to the "Mode Selection" screen shown in FIG. 4 (step ST5). At this time, the player touches the display region of the To-Friend Sending Mode with a finger, whereby the player is instructed to insert an additional coin (step ST7). When the player designates the "PHS FRIEND", transfer to the Enrolling Mode is performed (step ST9). The designation of the Check Mode for checking the enrollees performs mode switching (step ST 11), and the displayed screen is transferred to the game screen shown in FIG. 5 (step ST13). As shown in FIG. 5, the Enrollee Check Mode and the Mailbox Check Mode are displayed as options. Each mode is described below.

(1) The To-Friend Sending Mode

Figure 37:
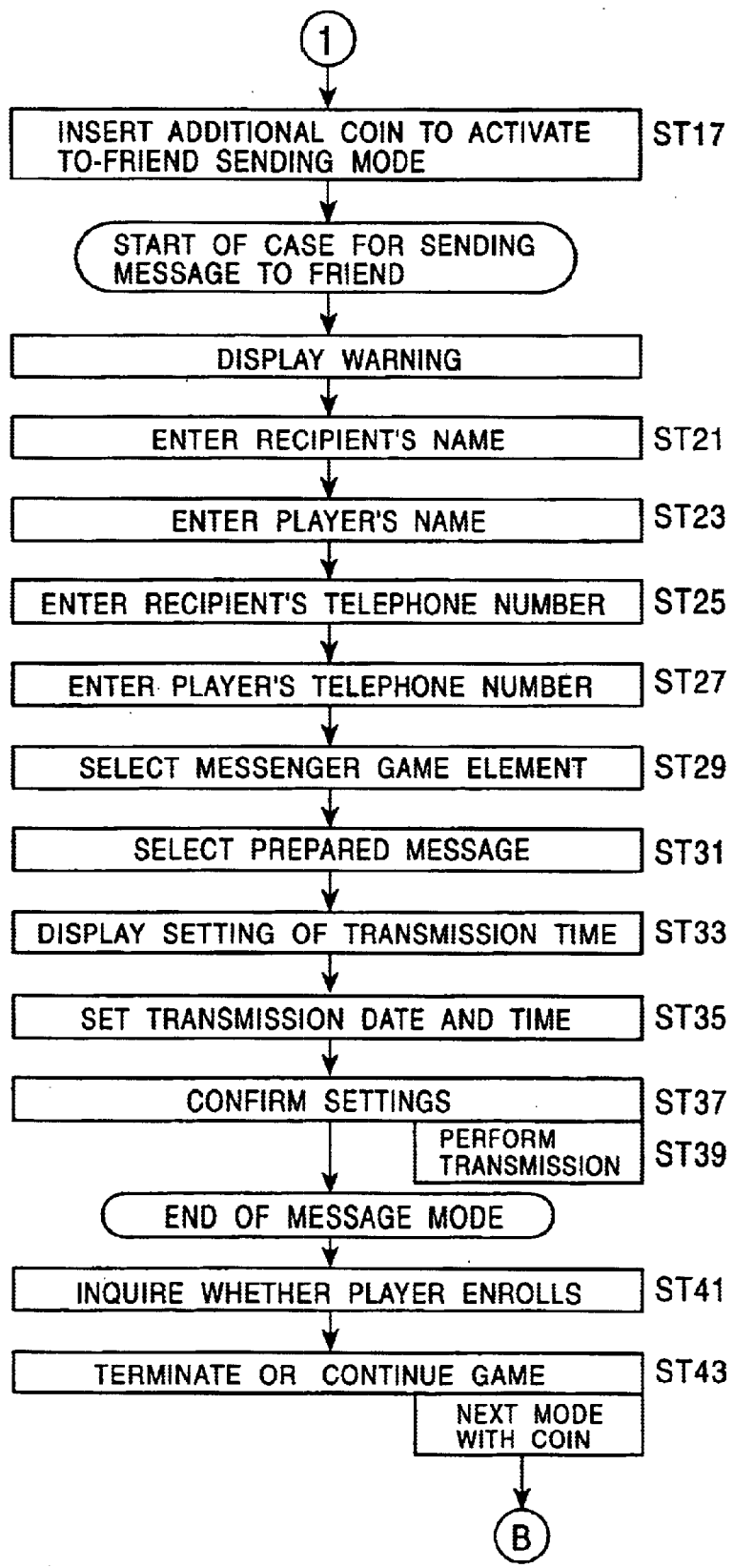
FIG. 37 is a flowchart illustrating the process of the To-Friend Sending Mode.

FIG. 37 shows the game process of the To-Friend Sending Mode. A predetermined warning is initially displayed before the process proceeds to step ST21, and monosyllabic characters including the Japanese syllabary (shown in FIG. 6A) are displayed in the form of a matrix. The player touches the character displayed regions corresponding to the name of a friend (i.e., a message receiver) of the player in the order of the family name and given name. The touched characters are displayed in the blank name-displayed field in the order of touches. When the player touches the "CONFIRM" icon after finishing the entering, the friend's name is stored in the RAM 102. Subsequently, the displayed game screen is switched to the game screen shown in FIG. 7. The game screen displayed in FIG. 7 is used to enter the player's name. The player performs operations on the game screen shown in FIG. 7, similarly to those on the game screen shown in FIG. 6A, and completes the operations before touching the CONFIRM icon, whereby the player's name is stored in the RAM 102 (step ST23).

Figure 8:
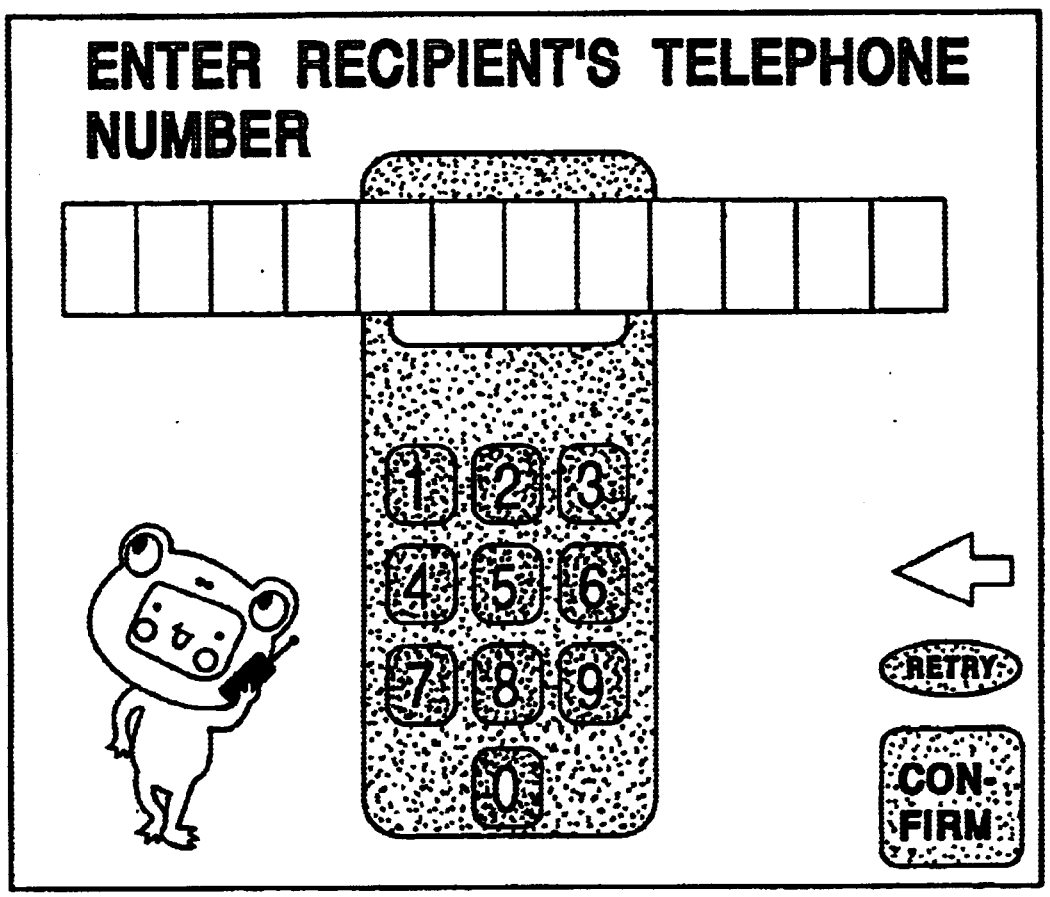
FIG. 8 is an illustration of a recipient's telephone-number entering screen.

After that, the recipient's telephone-number entering screen shown in FIG. 8 is displayed on the monitor 3. When the player touches ten-key icons in accordance with the number of a recipient, the entered numerals are sequentially displayed in the entering field. Having acknowledged the number, the player touches the "CONFIRM" icon to store the number in the RAM 102 (step ST25). The entering screen is switched to the player's telephone-number entering screen shown in FIG. 9. Similarly, the telephone number of the player is entered and stored in the RAM 102 (step ST27).

When the telephone number is entered, the messenger game-element selecting screen shown in FIG. 10 is displayed on the monitor 3. In this embodiment, seven messenger game-elements indicating message-sending messengers are displayed. The player touches the desired one display region among the display regions of the seven messenger game-elements, and the display mode of the selected messenger game-element is changed so as to be discriminated from the display modes of the other messenger game-elements, whereby the player can visually find the selection (step ST29). The messenger game-elements are provided with predetermined parlance patterns specific to them.

The selection of the messenger game-element transfers the selecting screen shown in FIG. 10 to the message selecting screen shown in FIG. 11. In the right and left of the message selecting screen, predetermined messages (prepared messages) such as "THANK YOU" and "CONGRATULATIONS" are displayed as strings of characters. Message selection is performed by touching the display region of the desired string of characters. The character-string selection processor 116 displays the selected messenger game-element in a part of the screen so that the selected messenger game-element can be recognized, while sequentially displaying selected prepared messages in the center of the screen, whereby a message being composed can be recognized (step ST31). In addition, the up and down arrow icons, displayed at the right of the screen, are used to scroll to other messages that are not simultaneously displayed due to the limited display area.

Figure 12:
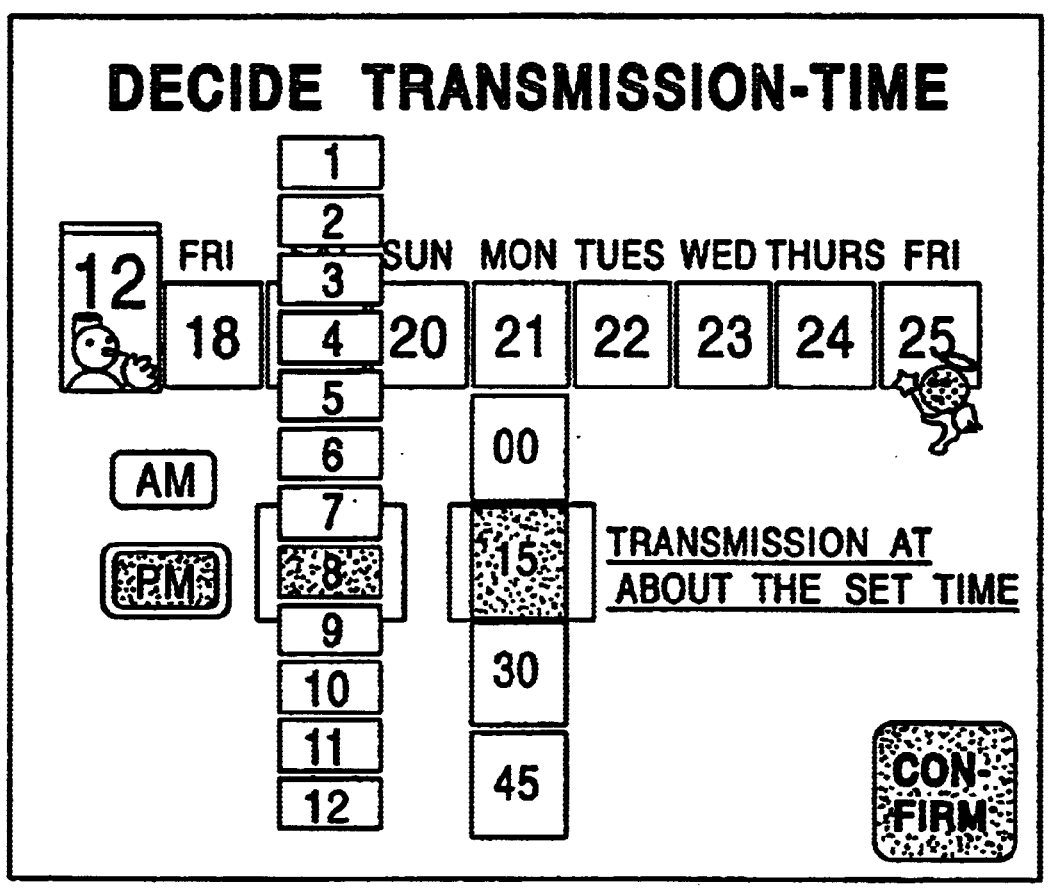
FIG. 12 is an illustration of a game screen for setting a date and time of transmission.
Figure 13:
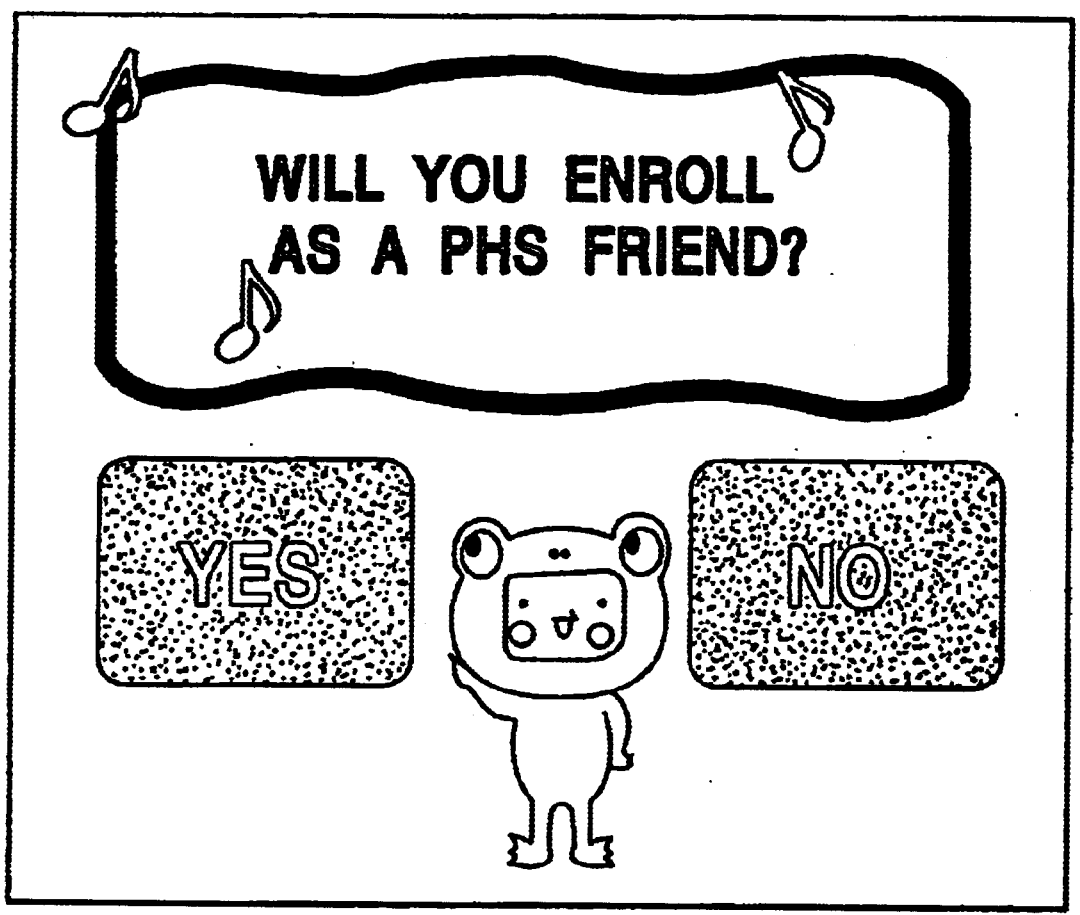
FIG. 13 is an illustration of a game system for guiding enrollment in the PHS FRIEND.

When the player touches the "CONFIRM" icon after composing the message, audio guidance or the like is used to explain the setting of a transmission time (step ST33). After that, the game screen (shown in FIG. 12) for designating a transmission time is displayed. As shown in FIG. 12, eight dates from a date of reference (December 18 in this embodiment) are horizontally displayed in the form of a calendar, together with days of the week, and hours from 1:00 to 12:00 are vertically displayed with the morning icon "AM" and the afternoon icon "PM" provided at the side. A 15-minute-unit timetable is also displayed so as to hang down from one of the displayed dates. By touching, for example, the display region of the date "21", the designation of the date, December 21, is completed. Then, the 15-minute-unit timetable is moved to the display region of the date "21", and is displayed so as to hang down from the date "21". The "PM" icon is touched, and eight o'clock in the afternoon is designated. Also the minute "15" is designated (step ST35). The display modes of the designated regions are changed so as to be discriminated from the other regions to be designated. The example shown in FIG. 12 indicates that the date and time "December 21, 8:15 a.m." is designated as a transmission time. The reason that the transmission time is set in 15-minute blocks is that the setting of the transmission time to be shorter may cause simultaneous use of the telephone unit 6. Accordingly, a predetermined interval is provided for the transmission time. When time setting is completed, a game screen (not shown) for confirming the settings (step ST37) is displayed. When the player acknowledges the settings, the settings are stored in the data storage unit 110. The setting of the transmission time may be performed just after composing the message (step ST39). In this case, without performing any operations, the player may immediately touch the "CONFIRM" ion or may set a past time from the present. Also, by preparing an icon such as "IMMEDIATELY", the player can touch the icon. With these operations, the To-Friend Sending Mode ends. After this, the screen (shown in FIG. 13) having the question "WILL YOU ENROLL AS A PHS FRIEND?" is displayed to prompt the player to enroll (step ST41). If the player enrolls (continues the game), the game process jumps to point B. If the player does not enroll, the game ends (step ST43).

After the termination of the game, the game machine 1 uses the transmission-time processor 117 to manage the transmission time. When detecting a designated time, the game machine 1 controls the communication controller 62 to send a call with the recipient's telephone number. At a time at which the game machine 1 can communicate with the recipient, the composed message, which is read from the data storage unit 102, is converted into audio signals by the audio synthesizing unit 115. The audio signals are output, together with the added identification information input from the microphone of the telephone unit 6.

(2) Enrolling Mode

Figure 14:
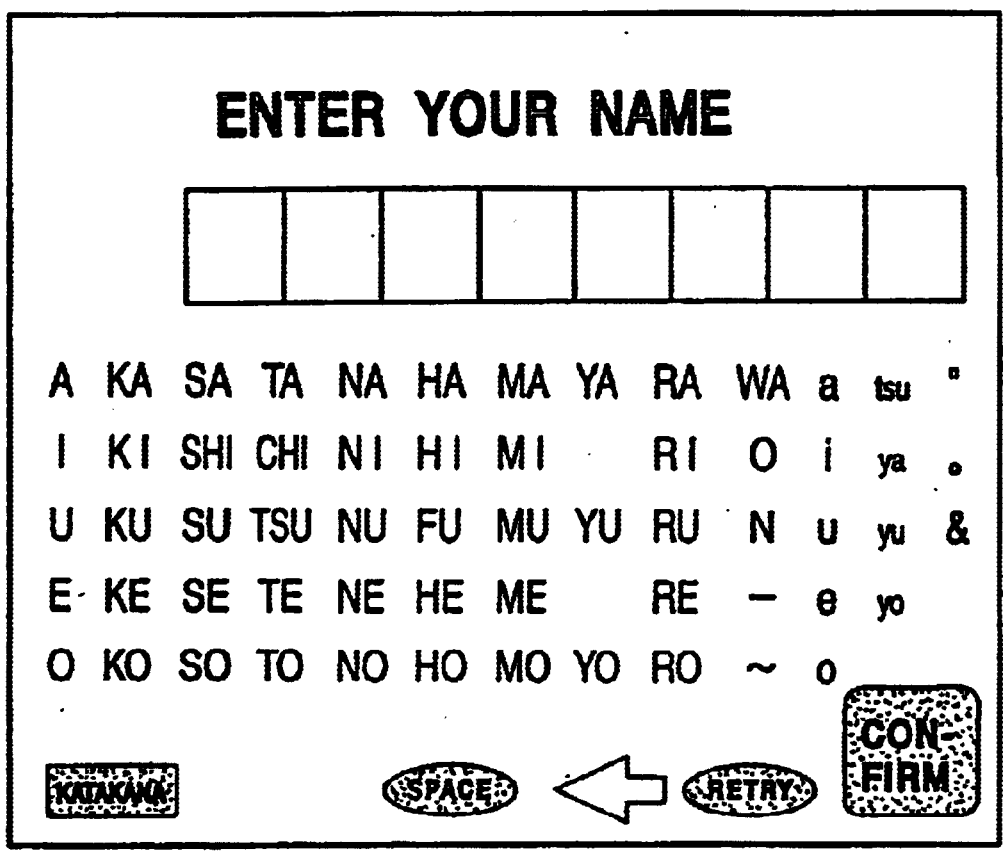
FIG. 14 is an illustration of a player's name entering screen.
Figure 38:
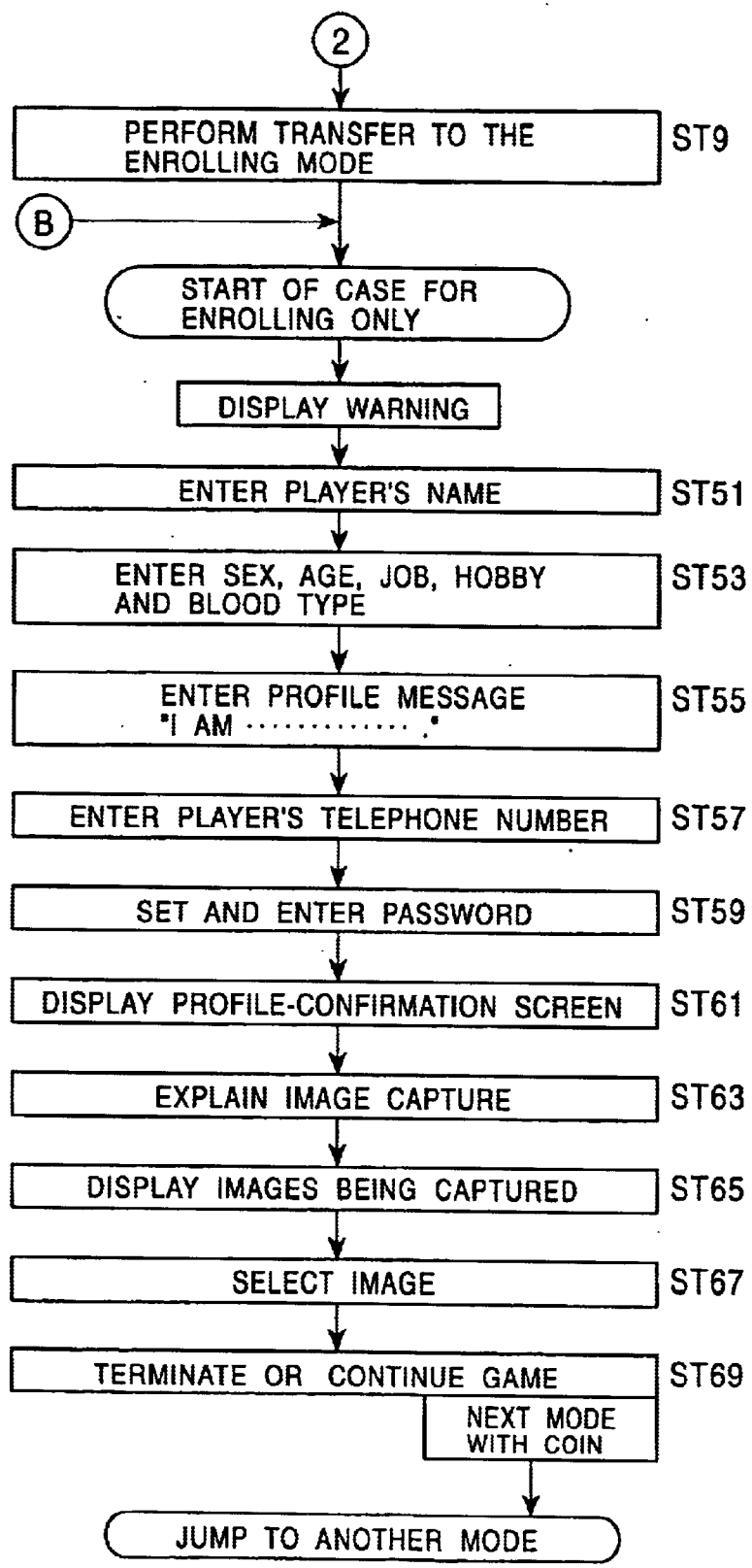
FIG. 38 is a flowchart illustrating the process of the Enrolling Mode.

FIG. 38 illustrates the game process of the Enrolling Mode. As shown in FIG. 14, the arrangement of phonetic expressions corresponding to Japanese syllabary including the fifty characters of Japanese syllabary are displayed in the form of a matrix, and the player touches the display regions of the characters in the order of the family name and given name of the player. The touched characters are sequentially displayed in the blank name display field. When the player touches the "CONFIRM" icon after finishing entering, the player's name is stored in the RAM 102 (step ST51).

After that, the game screen shown in FIG. 14 is transferred to the profile entering screen shown in FIG. 15. In this game screen, menus of "CHARACTER", "AGE", "JOB", "HOBBIES", and "BLOOD TYPE" are displayed, and a plurality of icons to be selected are displayed at the right of the menus. By touching the display region of a selected icon for each menu, the profile is created (step ST53). For the menu "AGE", the icon "19 years old" is displayed as a reference. In the case where the player is not nineteen years old, the player touches the right or left arrow icon indicating decrease or increase, thereby selecting the age of the player.

Figure 16:
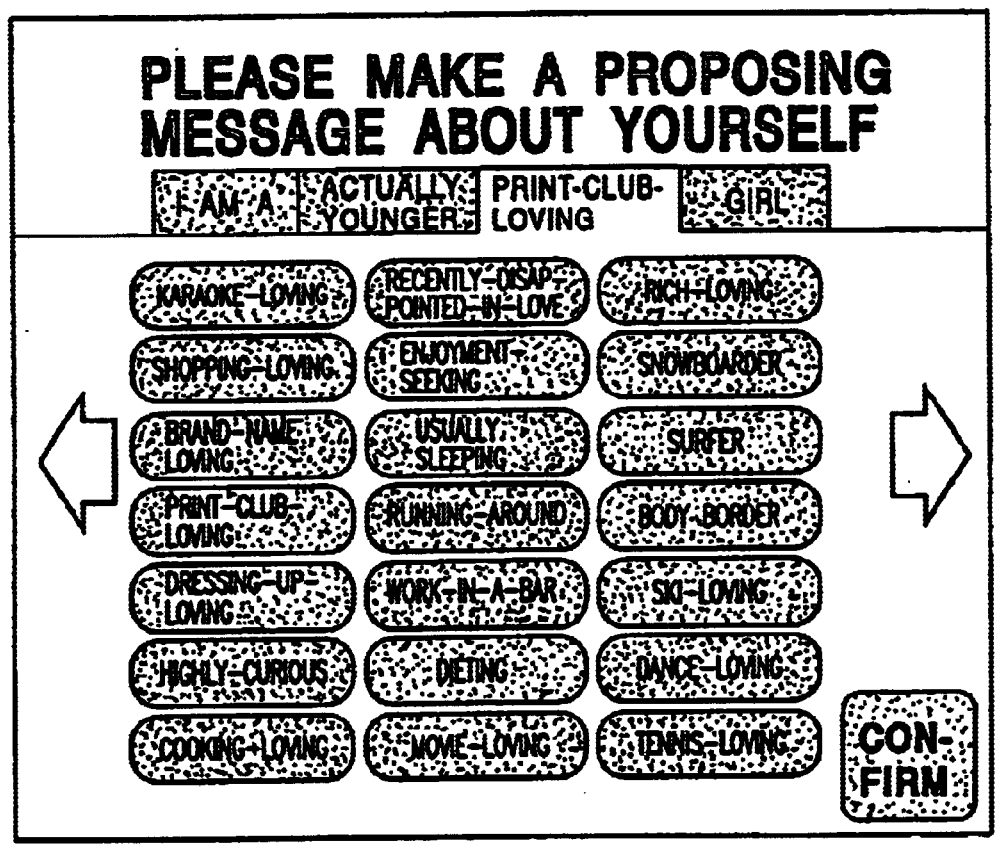
FIG. 16 is an illustration of a game screen for entering a profile message.
Figure 17:
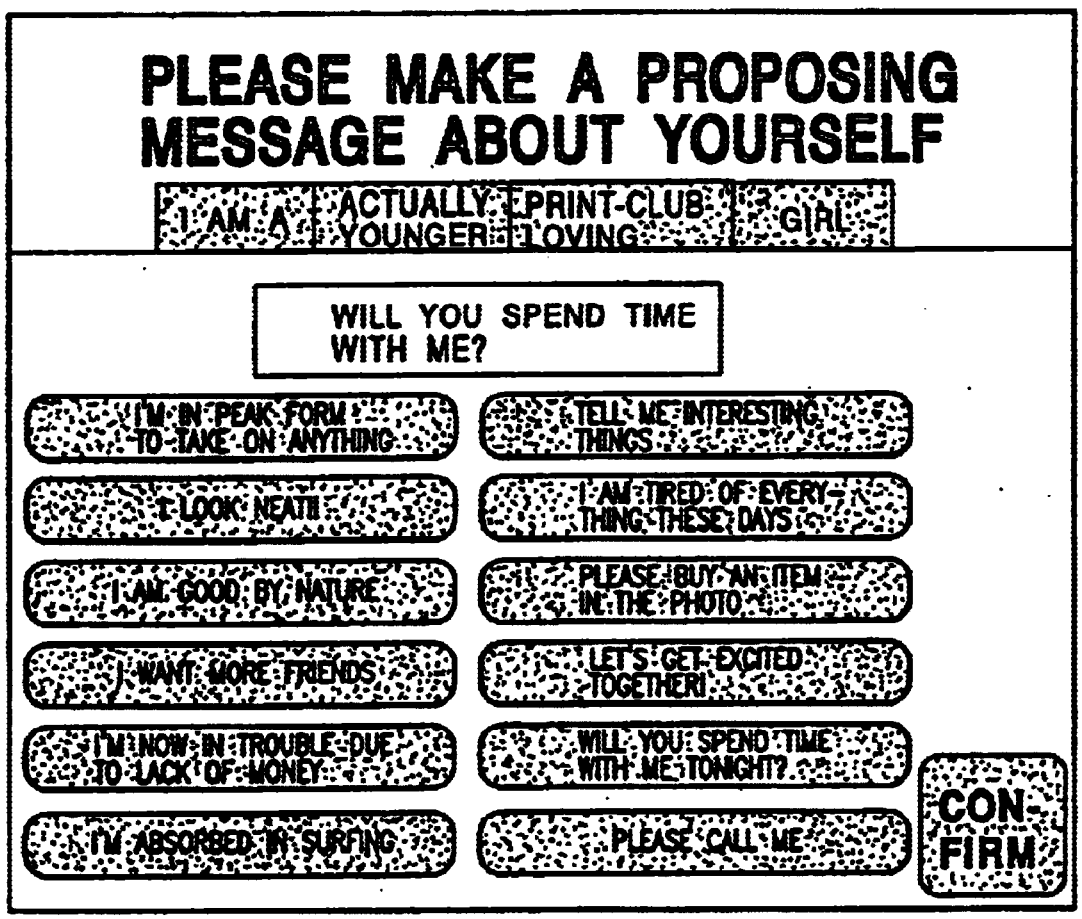
FIG. 17 is an illustration of a game screen for entering a profile message.

After that, the game screen, shown in FIG. 16, for entering a profile message for personal advertisement, is displayed. In the entering screen, four entering fields are prepared, and a list of phrases to be entered in the fields is displayed. FIG. 16 shows that the phrases: "I AM"; "ACTUALLY YOUNGER"; "PRINT-CLUB-LOVING"; and "GIRL", are selected. In the entering screen, a list of phrases to be entered is displayed in the field of the phrase "PRINT-CLUB-LOVING". By using the right or left arrow icon, the continued game screen shown in FIG. 17 can be displayed. Touching each entering field displays a list of corresponding phrases. By designating the desired phrases, the designated phrases are displayed in the entering field, and are stored in the RAM 102 (step ST55).

Figure 18:
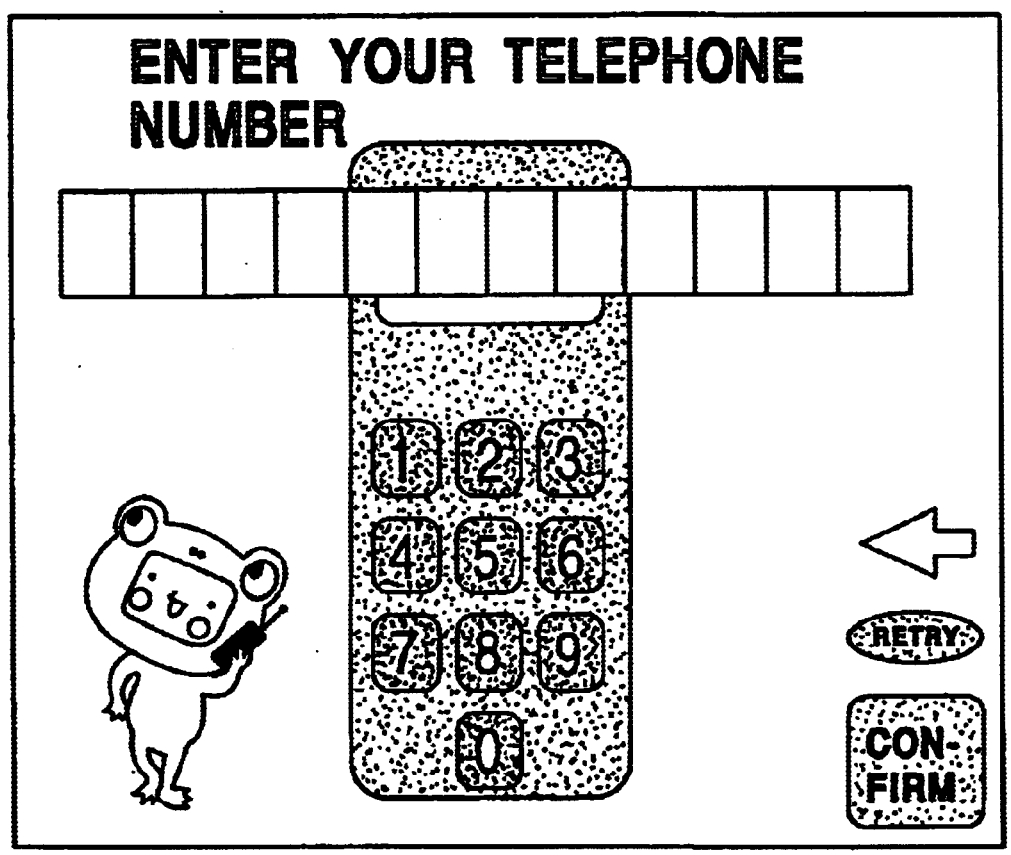
FIG. 18 is an illustration of a player's telephone-number entering screen.
Figure 19:
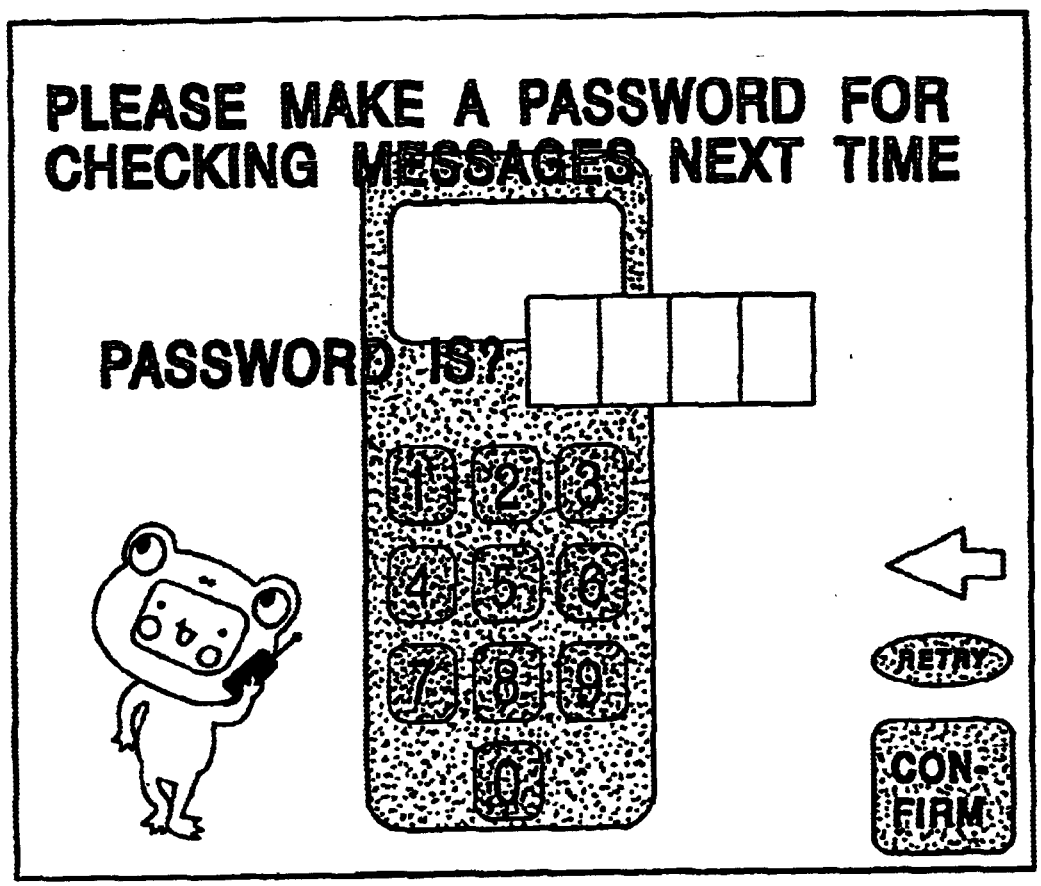
FIG. 19 is an illustration of a password-setting screen.

Subsequently, the game screen shown in FIG. 18 is transferred to the player s telephone-number entering screen shown in FIG. 18. After finishing the entering of the player's telephone number (step ST57), the password setting screen shown in FIG. 19 is displayed. In this embodiment, the password consists of four digits. By designating four numerals from among the displayed numerals "0" to "9", the password is displayed in the entering field and is stored in the RAM 102 (step ST59). In other words, in this embodiment, for specifying enrollee data and identifying the player, a combination of the four-digit number and the telephone number is used. This prevents another person from viewing the contents of the player information. The password is not limited to a four-digit number, but may be a number having more digits. In addition, its form is not limited only to a number. For example, by designating four characters from the syllabic characters shown in FIG. 14, a password may be formed. Also a combination of characters and numerals may be used. By using a complex password, as described above, personal information security is effectively maintained.

When the inputting of all the contents is completed, the confirmation screen shown in FIG. 20 is displayed which enables the player to check the input contents. For correction, by touching icons of four items, the confirmation screen is transferred to a correction screen. For example, when the input name is incorrect, the display mode of the name "KAORI" in the name field is changed so as to be discriminated from the display modes of the other items by touching the "NAME CORRECTION" icon. After that, the confirmation screen is transferred back to the game screen shown in FIG. 14, whereby only the name can be corrected (step ST61).

Figure 21:
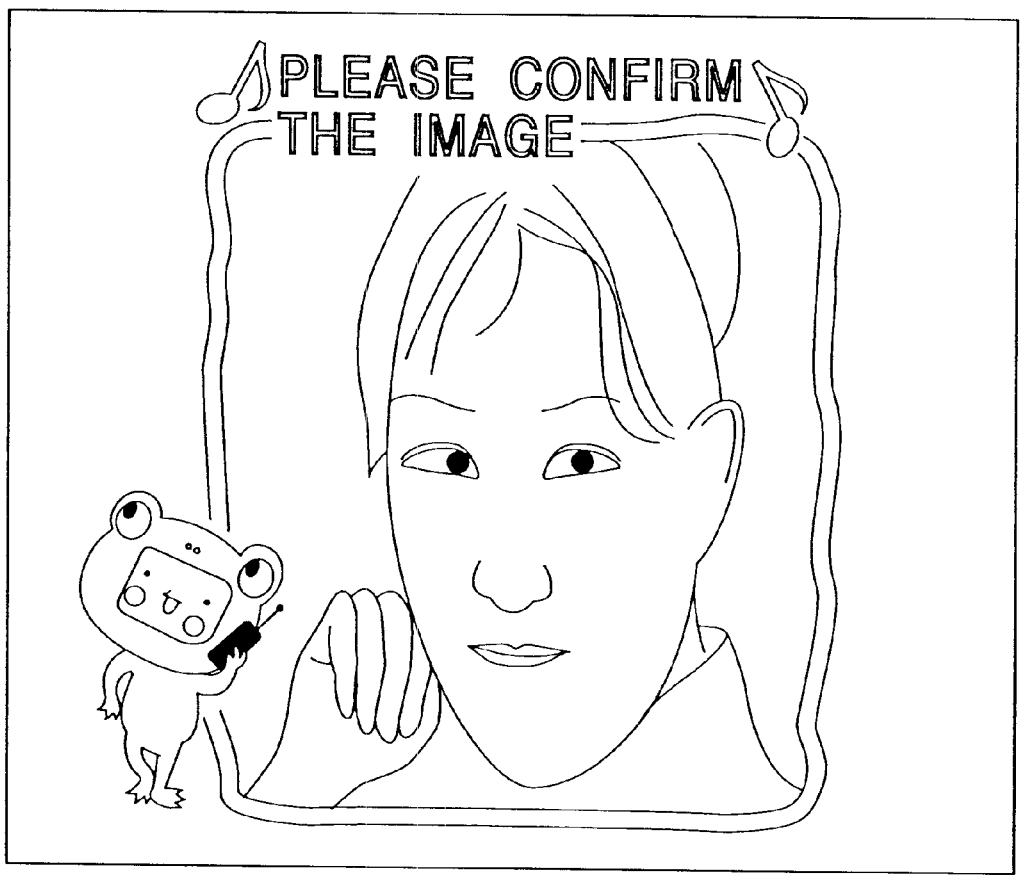
FIG. 21 is an illustration of a game screen for explaining image capture.

When the "CONFIRM" icon shown in FIG. 20 is touched, the contents of the profile are regarded as being correct, and the confirmation screen is transferred to the image-capture explaining screen shown in FIG. 21. FIG. 20 shows an operation mode in which the image-capture unit 5 repeatedly performs image-capturing operations. In this mode, the game machine 1 executes a way to perform image capture, using an explanation of the phrase "Your image is captured three times at three-minute intervals, and please touch one image among the three images displayed on the monitor 3". This explanation is preferably announced from the output speaker under the camera 51 (step ST63). When the image capture has been performed three times and is finished after the announcement (step ST65), the captured images are processed by the photographic image processing unit 52, and the processed images are displayed on the monitor 3, as shown in FIG. 22. Accordingly, by touching the display region of the desired image (step ST67), the designated face image is stored in the data storage unit 110 so as to be related with the data of the profile. This finishes the enrolling process, and a game screen for confirming whether the game is to be continued is displayed. If a continuation screen is designated, the game process jumps to another mode, and the present mode is terminated (step ST69).

The number of times for performing image capture is not limited to three times, but may be set to be at least one time (such as one time and twice) within a predetermined time. In addition, the image-capture timing is not only automatic but also preferably manual in which the player touches an arbitrary position on the screen of the monitor 3.

(3) Enrollee Check Mode

Figure 39:
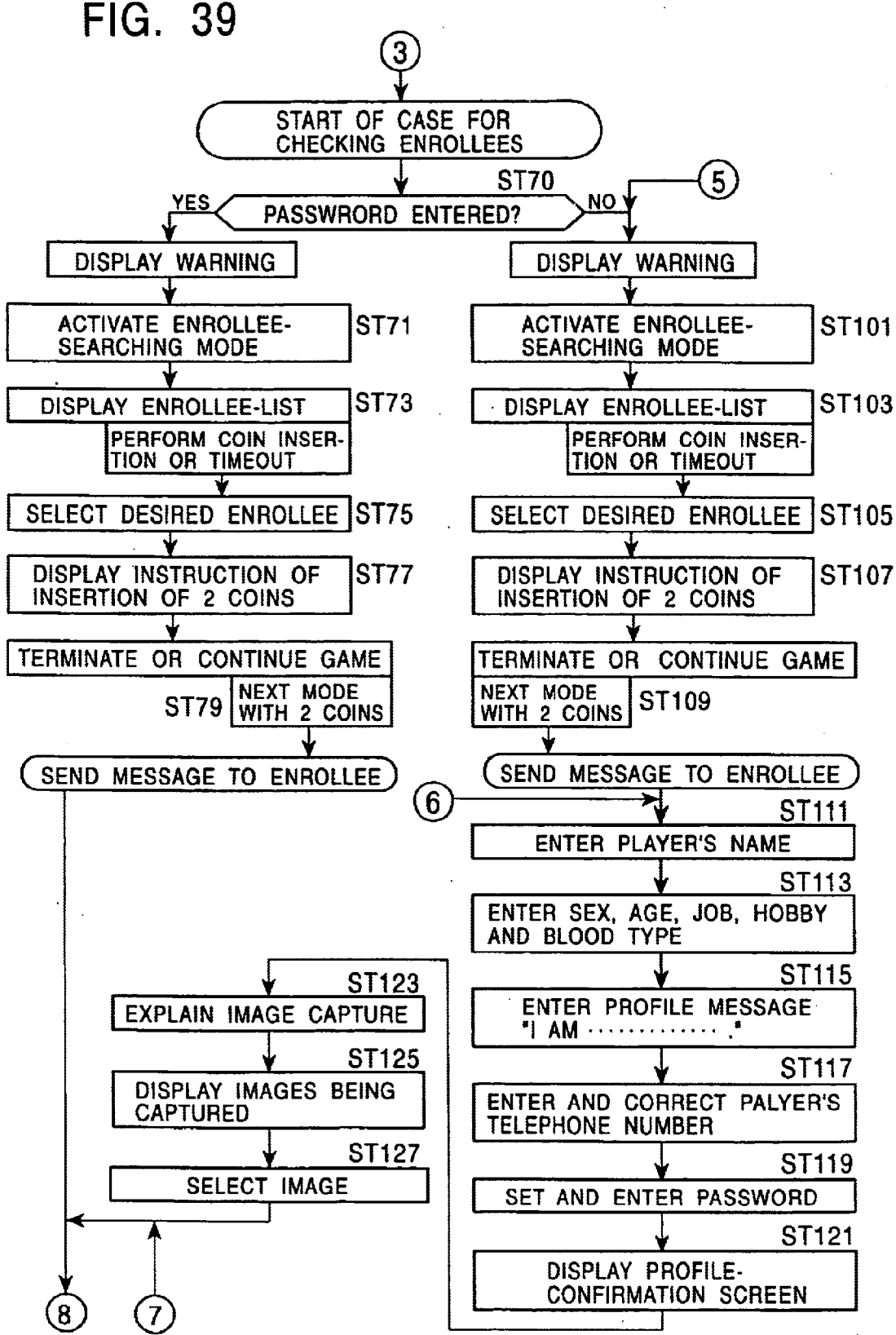
FIG. 39 is a flowchart illustrating the process of the Enrollee Check Mode.
Figure 40:
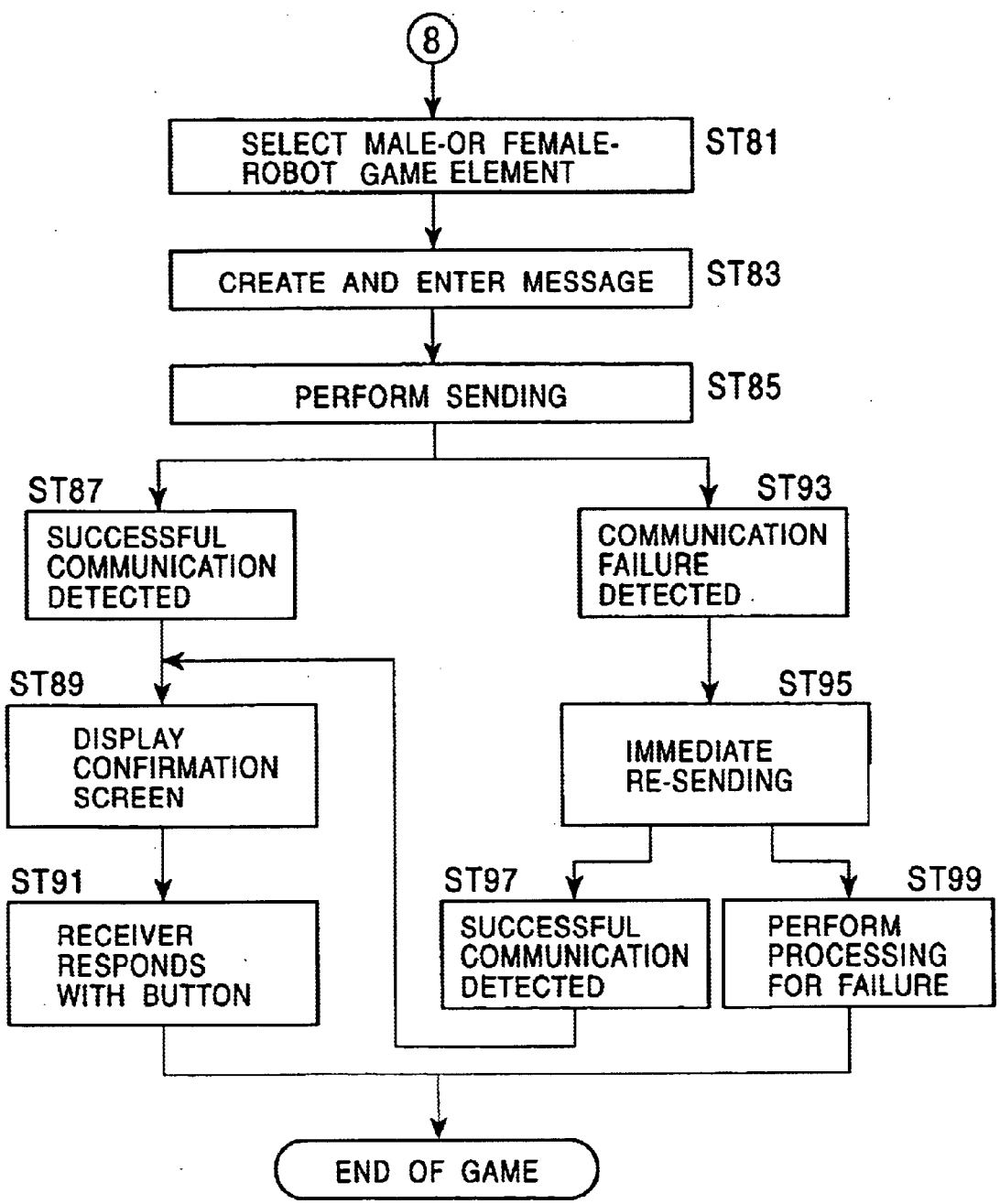
FIG. 40 is a flowchart illustrating the process of the Enrollee Check Mode.

FIGS. 39 and 40 are flowcharts illustrating the process of the Enrollee Check Mode. Touching the display mode of the phrase "MANY PHS FRIENDS" shown in FIG. 5 activates the Enrollee Check Mode. Initially, a password entering screen (not shown) similar to the game screen shown in FIG. 31 (described below) is displayed. In the password entering screen, entering fields for a password and a telephone number, and an icon that "has not been recorded yet" are displayed. If the player has already been enrolled, the player can enter the "Enrollee Check Mode by the Enrolled Player" by entering the password and telephone number. If the player has not been enrolled yet, the player can enter the "Enrollee Check Mode by Player Who Has Not Yet Been Enrolled" by touching the icon that "has not yet been recorded".

Processing for the "Enrollee Check Mode by the Enrolled Player" is performed in steps ST71 to ST79. In other words, a mode for searching the enrollees is activated (step ST71). The data of the profiles of the enrollees are sequentially read from the data storage unit 110, and the enrollee-list display screen shown in FIG. 23 is displayed (step ST73).

The enrollee-list display screen displays the contents of the profile created in the Enrolling Mode are displayed, together with a face image, and displays, in the lower part of the screen, the icons of the "PREVIOUS PERSON" and the "NEXT PERSON" are displayed with reduced images of both persons. By touching each icon, the enrollees are sequentially viewed. A time for checking is set beforehand. When it is found by monitoring the time measured by the time-measuring device 108 that the viewing of many enrollees takes more than the set time, insertion of one coin is instructed as a condition for continuing the viewing (step S73). In the bottom right of the screen, the "MAKE-A-CALL" icon is displayed. While a desired enrollee is displayed from among the displayed enrollees (step ST75), the game screen shown in FIG. 25 is displayed to instruct insertion of two coins for sending a message (step ST77). For only enrollee checking, no insertion of coins terminates the "Enrollee Check Mode by the Enrolled Player". When the two coins are inserted, the "Enrollee Check Mode by the Enrolled Player" is terminated (step ST79), and the game process proceeds to step ST81 shown in FIG. 40. The telephone number, etc., of the selected enrollee is read from the data storage unit 110 by the receiver-selection processor 129, which enables automatic calling.

Figure 27:
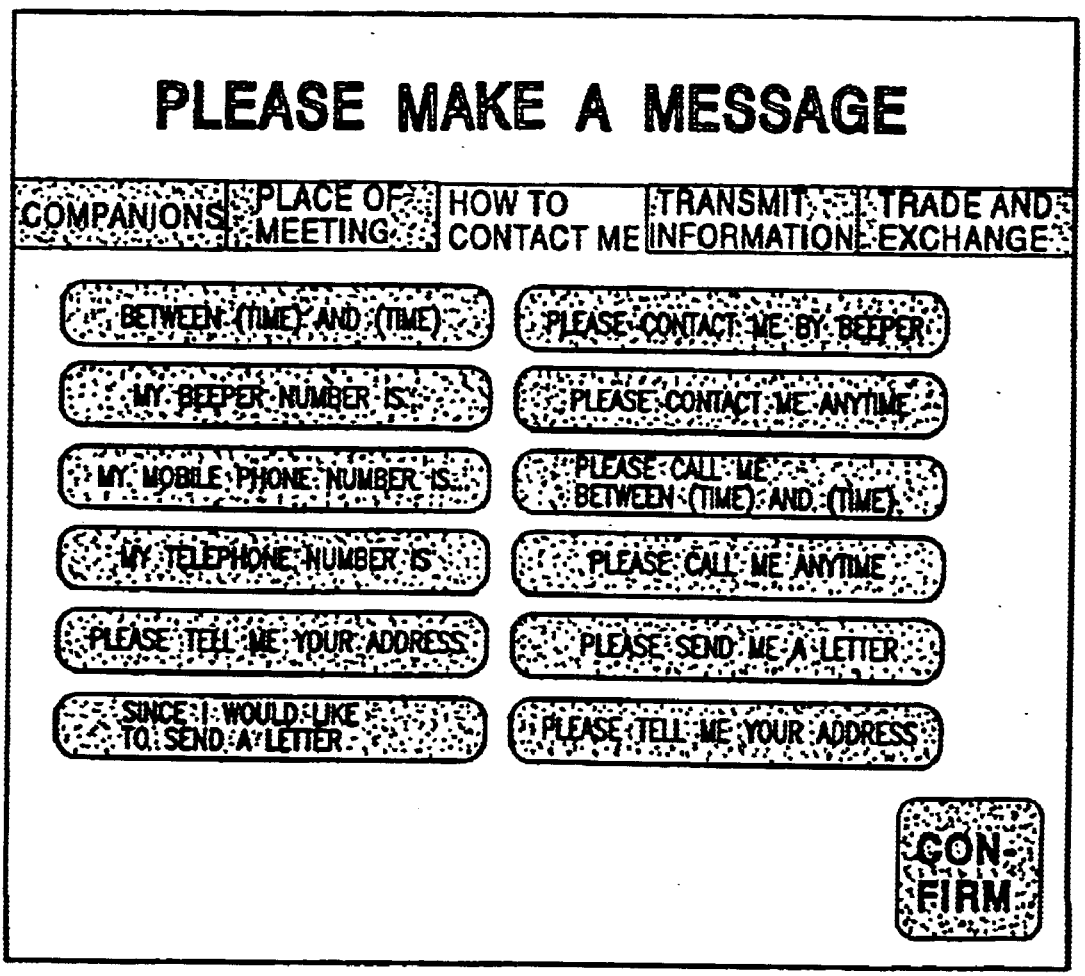
FIG. 27 is an illustration of a game screen for displaying a combined message 1.
Figure 28:
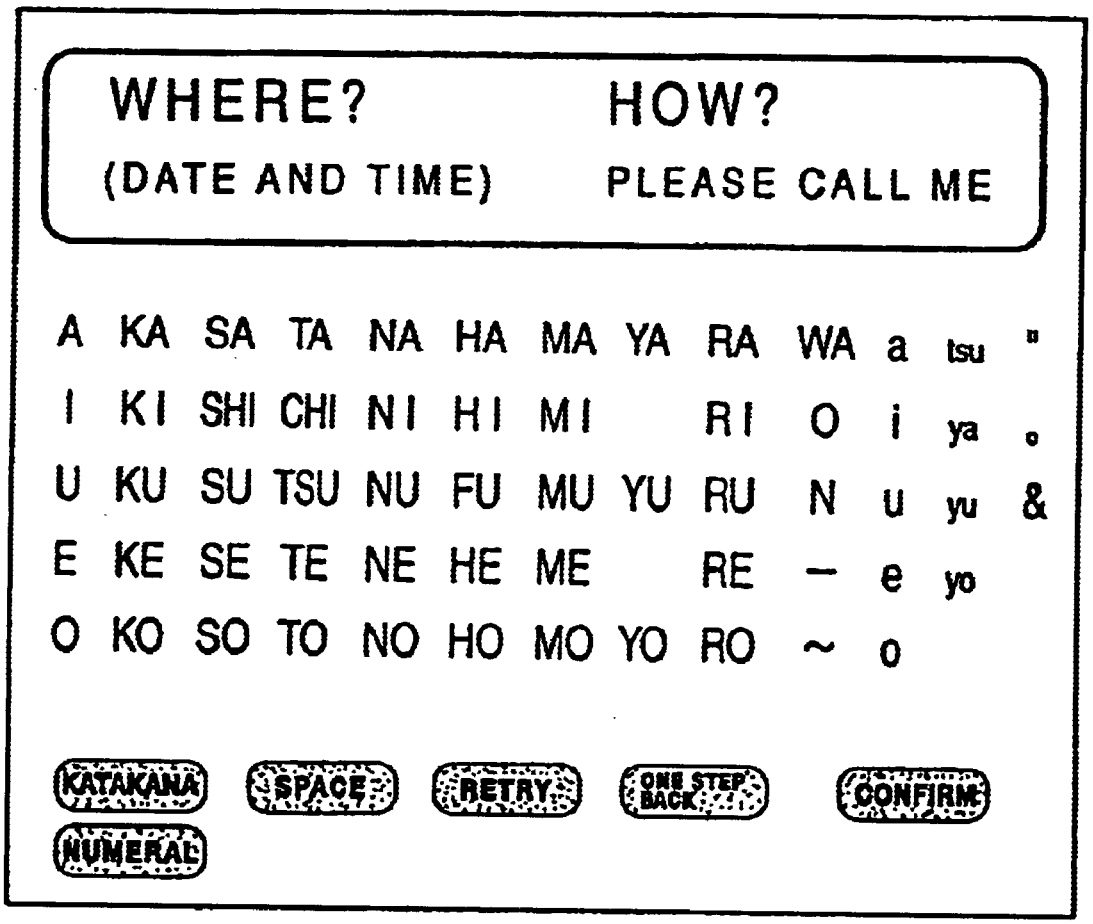
FIG. 28 is an illustration of a game screen for displaying a combined message 2.

In step ST81, the game screen (shown in FIG. 26) having the male-robot game element and the female-robot game element is displayed. By touching the display region of the desired one robot game element, the touched robot game element is selected. After the selection of the robot game element is finished, a game screen (shown in FIG. 27) of combined message 1 is displayed. This game screen has, as message fields, "COMPANION", "PLACE OF MEETING", "HOW TO CONTACT ME", "TRANSMIT INFORMATION", and "TRADE AND EXCHANGE". By touching the desired icon, a list of corresponding contents is displayed. FIG. 27 shows an example of display in which the "HOW TO CONTACT ME" field is designated, and its contents are displayed in the form of a list. In this example, by touching the display region of the phrase "MY MOBILE PHONE NUMBER IS . . . " before touching the "CONFIRM" icon, the displayed game screen is transferred to the game screen shown in FIG. 28 in which the phonetic expressions corresponding to the fifty characters of the Japanese syllabary and other syllabic characters are displayed. In the bottom of the game screen, the "KATAKANA", and "NUMERALS" icons, etc., are displayed. By touching each icon, for example, the "NUMERALS" icon, the fifty characters of the Japanese syllabary are switched to numerals. By using the syllabic characters and the numerals, a message such as "ON(date), AT(time) " and "PLEASE CALL ME" can be created (step ST83). By touching the "CONFIRM" icon, a call sending process is initiated (step ST85). In accordance with the touching of the "CONFIRM" icon, all or part of the profile contents of the player is added to the message to be transmitted, whereby the message to be transmitted includes the contents of self-introduction by the person who transmits the message. The telephone number in the phrase "MY MOBILE PHONE NUMBER IS . . . " and the profile of the player have already been recorded in the data storage unit 110 of the game machine 1 in the Enrolling Mode (shown in FIG. 38) and the Enrollee Check Mode (shown in FIG. 39). Therefore, they are read and automatically written in the unwritten part, and automatic adding processing is performed.

Figure 29:
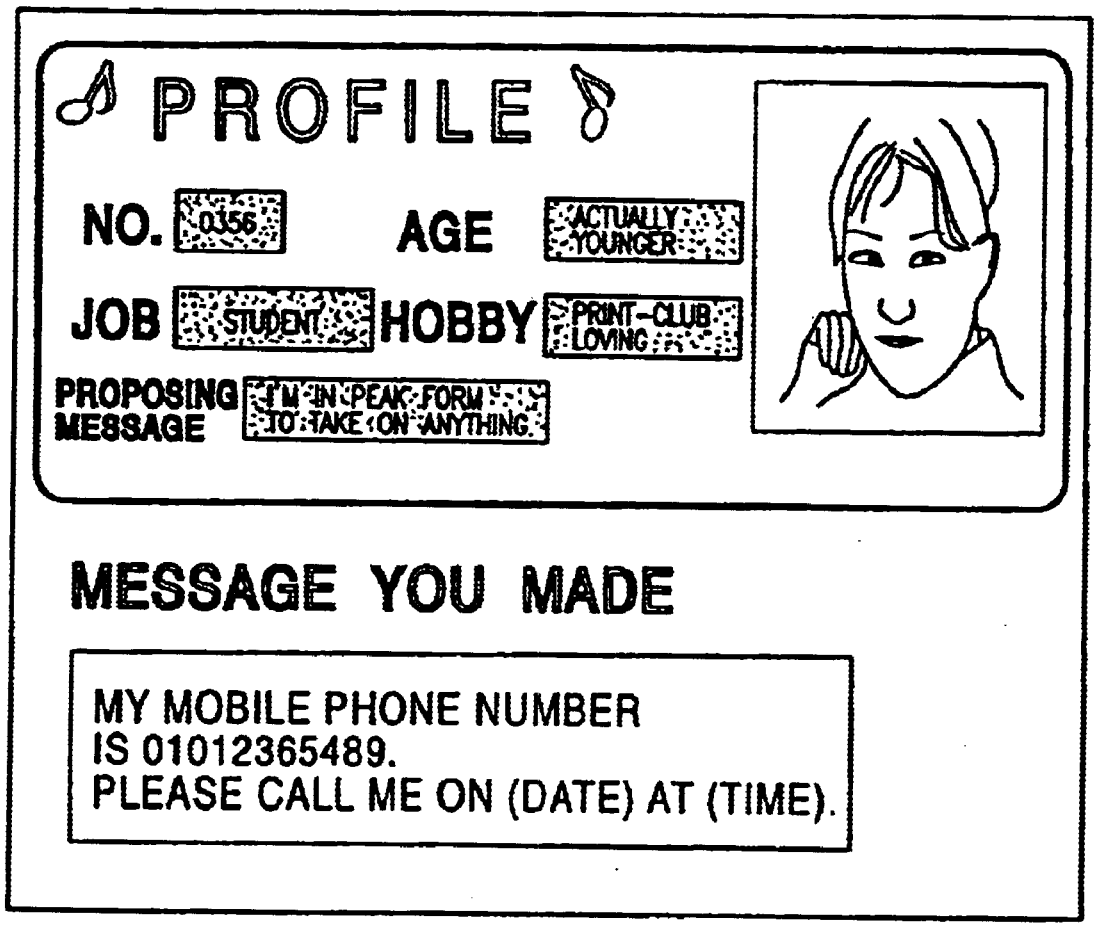
FIG. 29 is an illustration of a game screen displayed when communication is established.

When connection with the recipient is established as a result of call sending (step ST87), the displayed screen is switched to the on-communication screen shown in FIG. 29. In other words, the face image and profile of the recipient are displayed, together with the transmitted message for confirmation (step ST89). At this stage, it is determined whether a reply in response to the player-transmitted message by the recipient has been received. The response is performed by operations in which the numeral button "1" of the recipient's telephone is touched when the recipient agrees to the message while the numeral button "0" of the recipient's telephone is touched when the recipient disagrees to the message. These operations are recorded beforehand, and are explained in the form audio guidance to the recipient before or after the message is transmitted.

When a frequency signal corresponding to the numeral button "1" is received from the recipient, an indication meaning agreement is displayed in the on-communication screen, while a frequency signal corresponding to the numeral button "0" is received, an indication meaning disagreement is displayed (step ST91). These indications may be displayed various forms. For example, the word "yes" or "no" may be directly displayed. In addition, in order that the entertainment of the game be enhanced, for disagreement, the response processor 120 may perform image processing for, e.g., transforming (or deforming) the face image of the recipient in the on-communication screen. For agreement, the response processor 120 may perform image processing for, e.g., transforming the face image of the recipient into an image corresponding to a smile.

In the case where communication fails to be established (step ST93), re-calling is tried just after detecting no communication (step ST95). When communication with the recipient is successfully established (step ST97), the game process jumps to step ST89. Even if communication with the recipient fails to be established just after the re-calling, it is determined that communication tries were unsuccessful, and the communication failing screen shown in FIG. 30 is displayed in which the brightness (or color) of the displayed screen is faded compared to that when communication is established. The communication failing screen also indicates that re-calling is tried after an elapse of a predetermined time and a result of the try, and the communication contents are stored in the RAM 102 (step St99) before the game is temporarily terminated.

Figure 42:
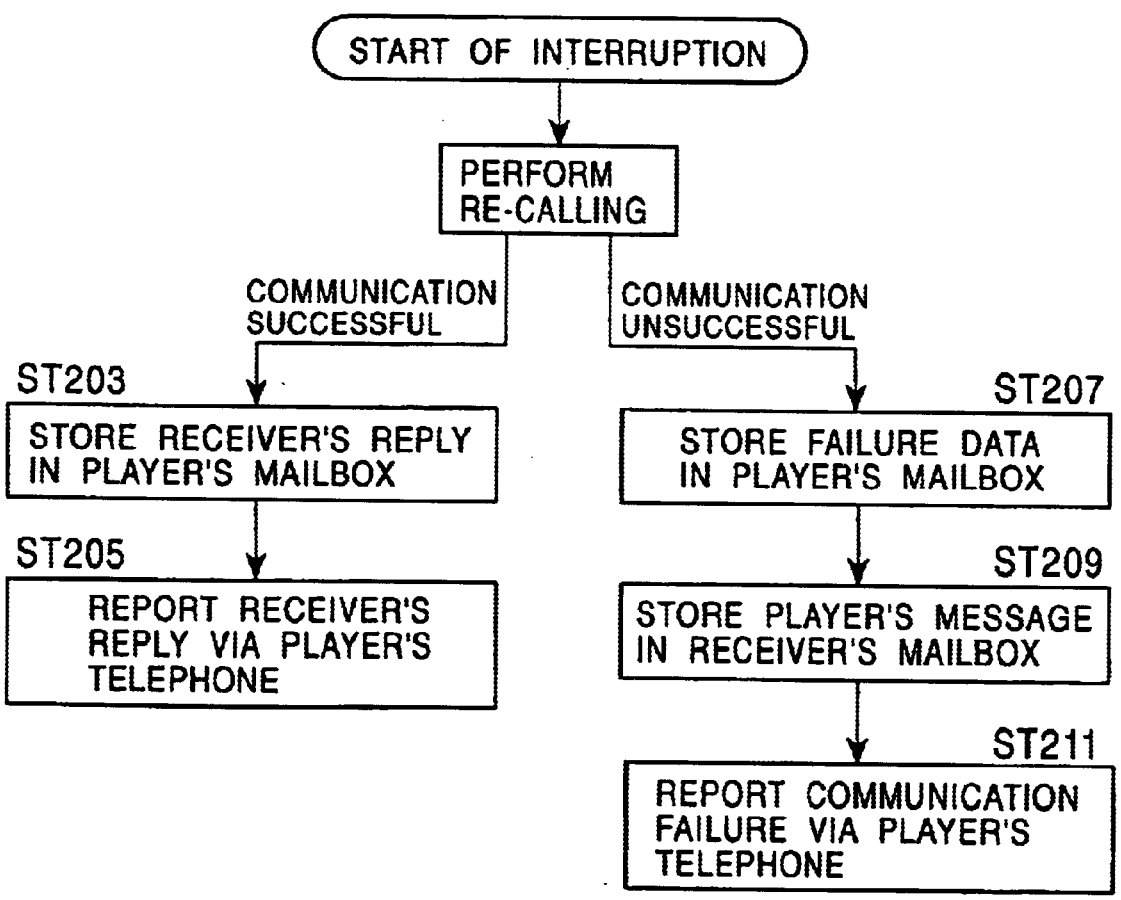
FIG. 42 is a flowchart illustrating an interruption process performed after the termination of a game in the case where communication failure is detected after performing immediate re-calling.

The process of the re-calling after the game ends, indicated in step ST99 (shown in FIG. 40), is described with reference to the interruption flowchart shown in FIG. 42.

In the case where communication with the recipient fails to be established in the re-calling just after unsuccessful communication, a time is measured for monitoring by the time-measuring unit 108. When the measured time reaches a preset free time after an elapse of a predetermined time, an interruption process is initiated to perform re-calling (step ST201). When communication is successful, i.e., a message was successfully transmitted to the recipient, a reply from the recipient is stored in the mailbox (the field of reception records) of the player (step ST203). After that, the free time after an elapse of the predetermined time is used to make a call to the telephone of the player for reporting the type of the reply from the recipient, which means agreement or disagreement (step ST205). Conversely, when communication was unsuccessful even in the re-calling, information of unsuccessful communication and the data of the time of the unsuccessful communication are stored in the mailbox (the field of reception records) of the player (step ST207). After that, the free time after an elapse of the predetermined time is used to make a call to the telephone of the player for reporting the unsuccessful calling (step ST211). The reason that the result of performing communication after the game ends is stored in the mailbox of the player is for data storage as another form of report in consideration of cases where the telephone reports (steps ST205 and ST211) fail.

The process of the "Enrollee Check Mode by the Player Who Has Not Yet Been Enrolled" (shown in FIG. 39) is executed in steps ST101 to St127. Since steps ST101 to ST109 are the same as steps ST71 to ST79, and steps ST111 to ST127 are the same as steps ST51 to ST69 (shown in FIG. 38), descriptions of steps ST101 to ST109 and ST111 to ST127 are omitted.

(4) The Mailbox Check Mode

Figure 31:
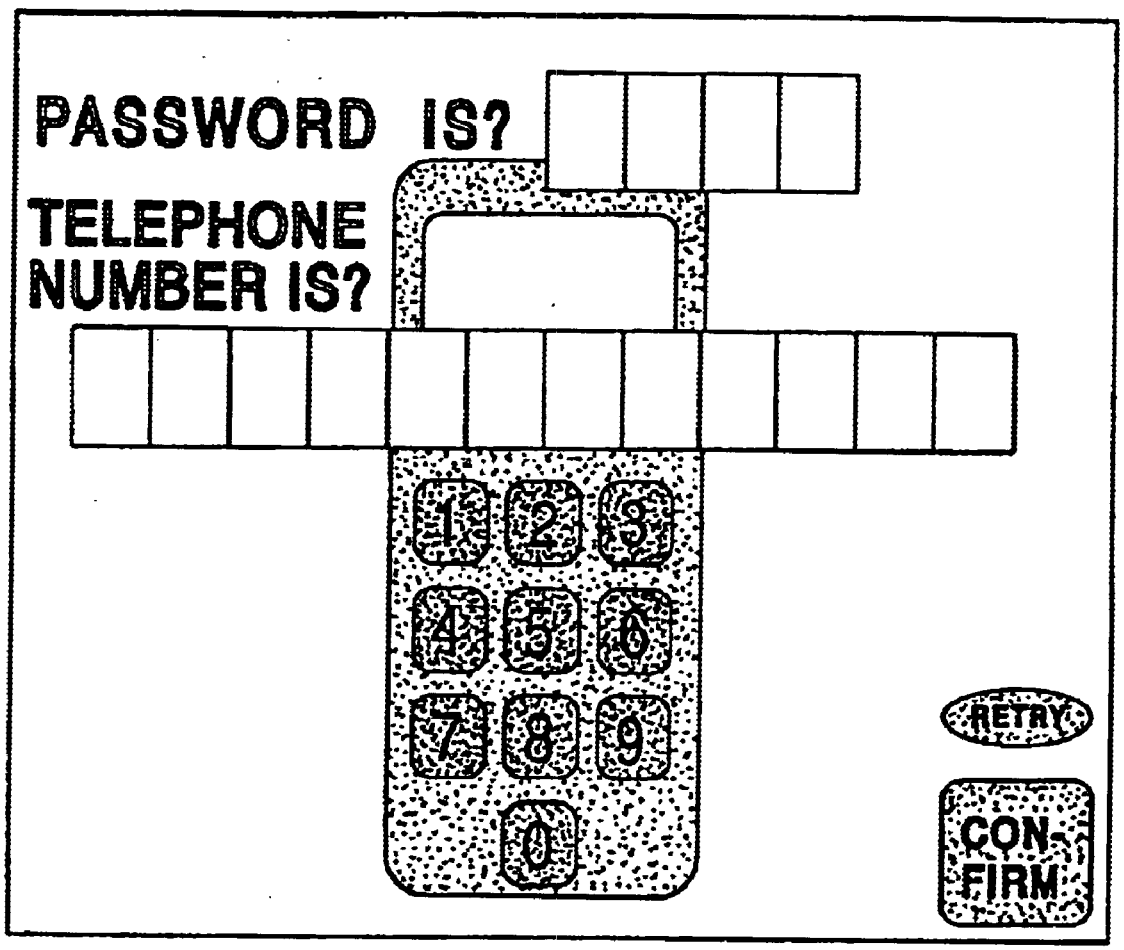
FIG. 31 is an illustration of a password-setting screen.
Figure 32:
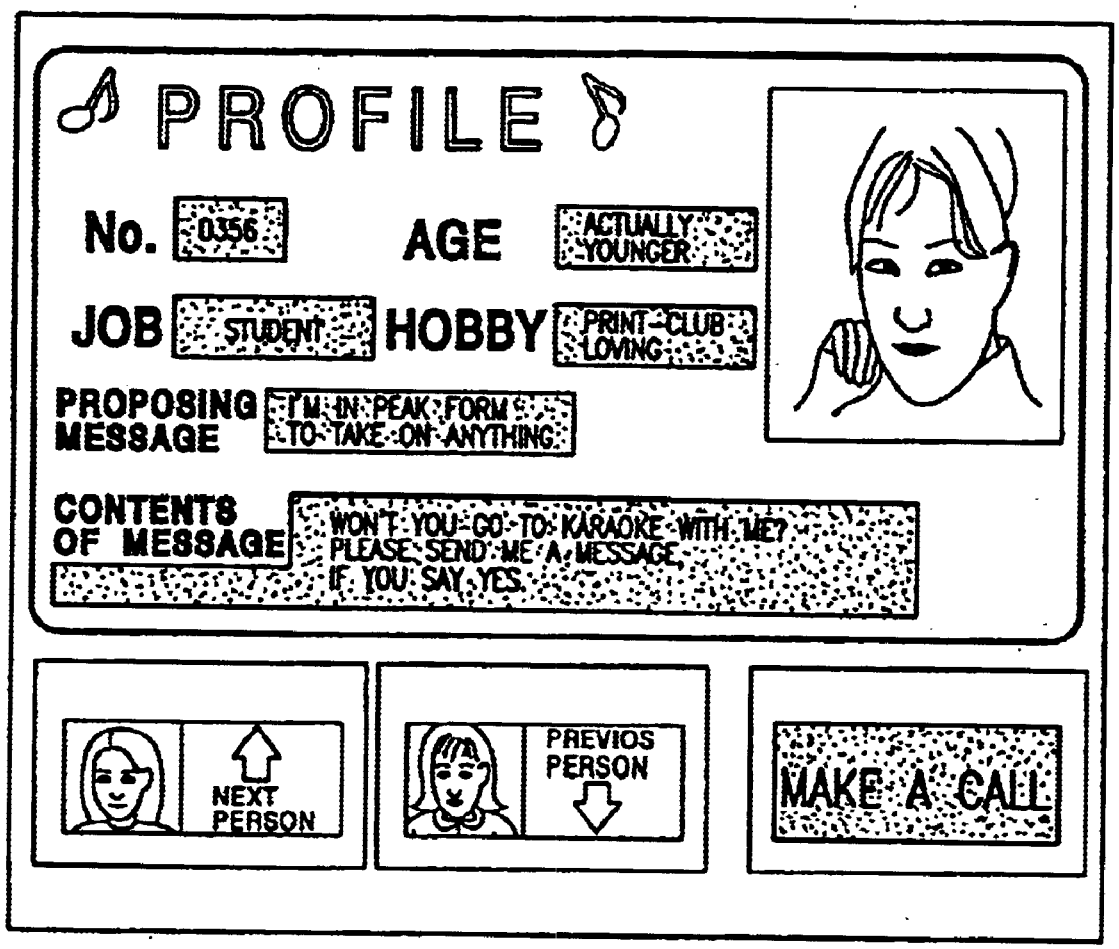
FIG. 32 is an illustration of a game screen displaying the content list of a player's mailbox.
Figure 41:
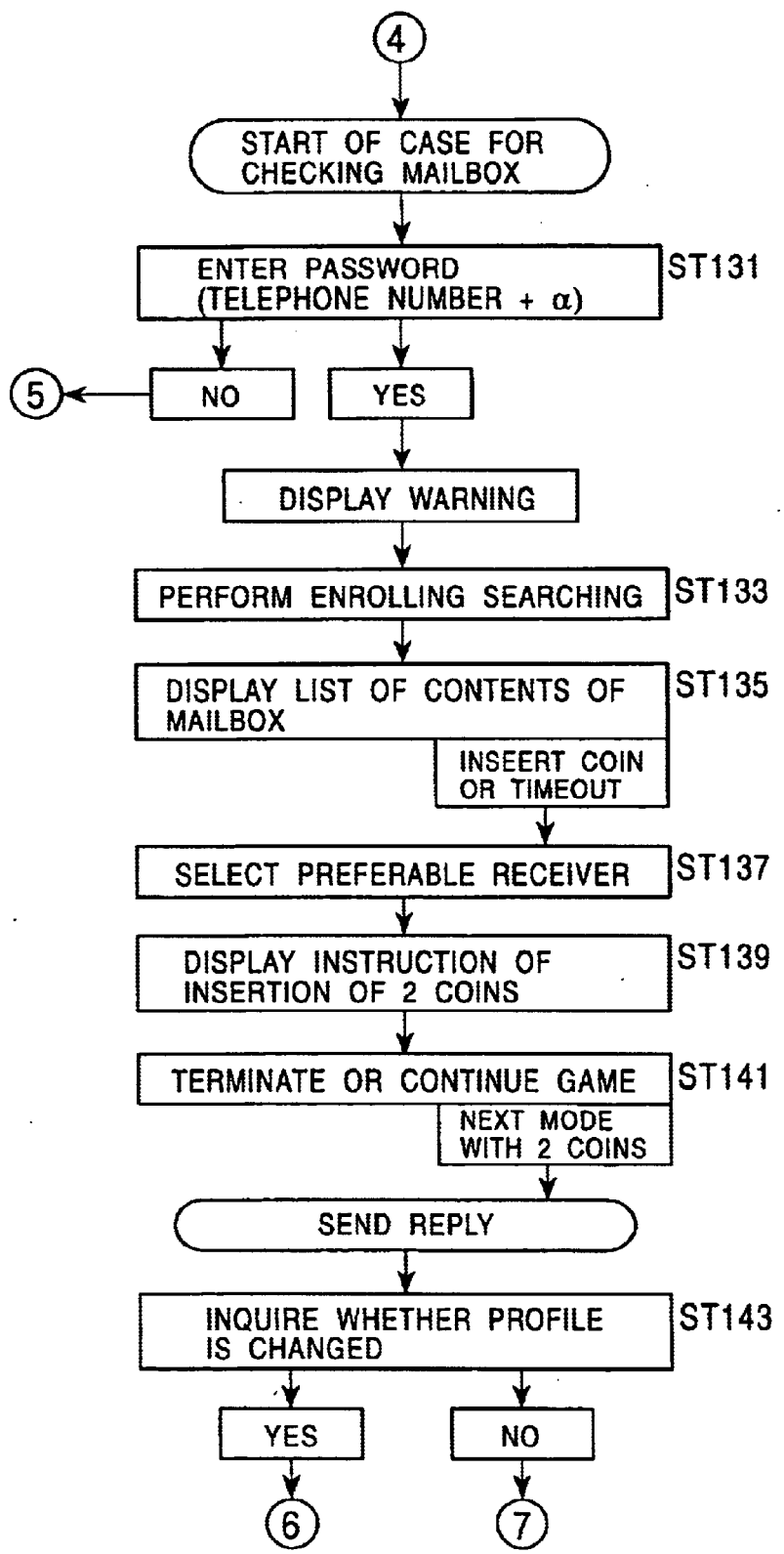
FIG. 41 is a flowchart illustrating the process of the Mailbox Check Mode.

FIG. 41 is a flowchart illustrating the game process of the Mailbox Check Mode. By touching the display region of the phrase "YOUR MAILBOX: PASSWORD REQUIRED" shown in FIG. 5, the password entering screen shown in FIG. 31 is displayed. From among the displayed numerals "0" to "9", four numerals are selected and entered in the order of the password, together with the telephone number (step ST131). If the password verifier 124 has determined that the entered password matches the password entered in the Enrolling Mode, the game process proceeds to step ST133, and transfers the displayed screen to the game screen shown in FIG. 32. If the password verifier 124 has determined that the entered password does not match the password entered in the Enrolling Mode, the game process indicates or announces (immediately or after re-entering of a predetermined number of times is allowed) a warning message such as "YOU ARE NOT AN ENROLLEE, OR YOUR PROFILE DATA WERE ERASED SINCE * * MONTHS PASSED FROM THE DATE OF ENROLLMENT". After that, the game process returns to step ST101.

If the password verifier 124 has determined that the entered password matches the password entered in the Enrolling Mode, the game process transfers to a mode for searching the enrollees, and the profile field of the player is displayed. At the same time, in almost the center of the displayed screen, there is displayed a message-display field for one person in the case where communication was unsuccessful although a message was sent from another enrollee (step ST135). When plural messages were sent, a list of other enrollees who failed to establish communication is displayed in the bottom of the displayed screen so that the enrollees can be switched by using the "NEXT PERSON" icon and the "PREVIOUS PERSON" icon. When it takes more than a predetermined time, the player is prompted to insert one coin. Insertion of the coin prolongs the predetermined time for mailbox checking.

Figure 33:
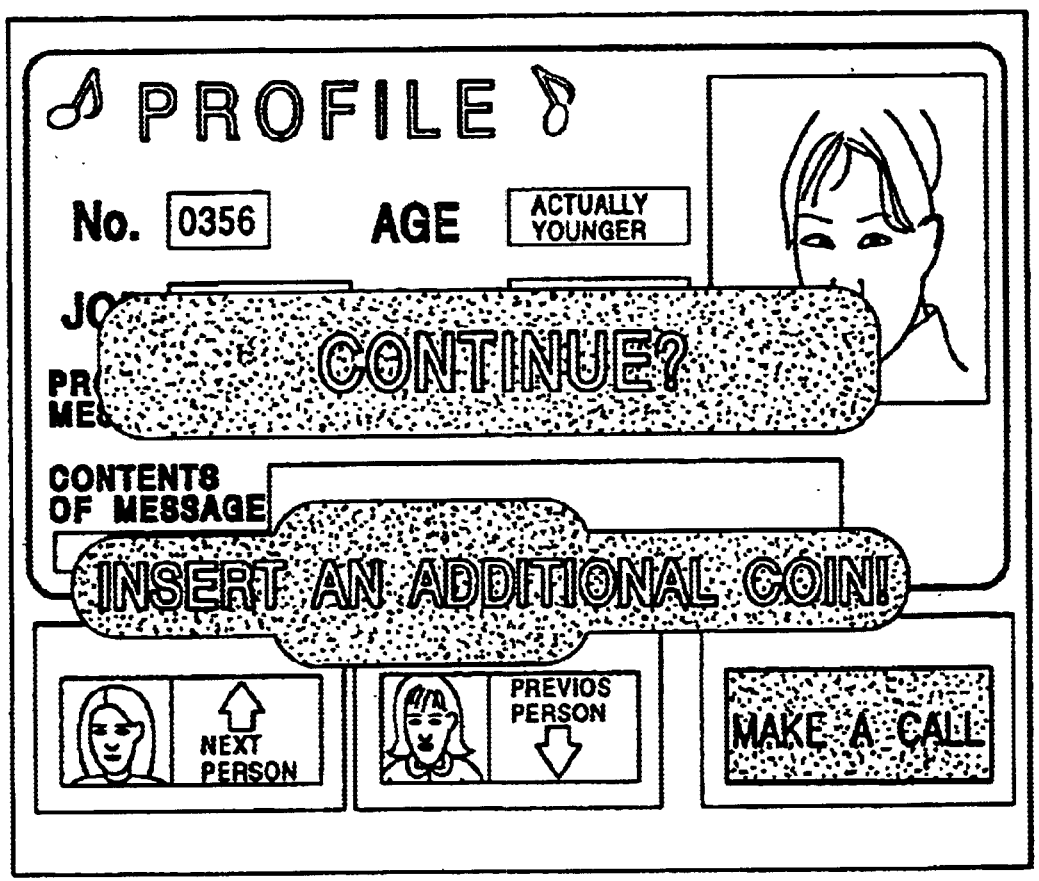
FIG. 33 is an illustration of a game screen for inquiring about the continuation of checking in the display of a content list of a player's mailbox.
Figure 34:
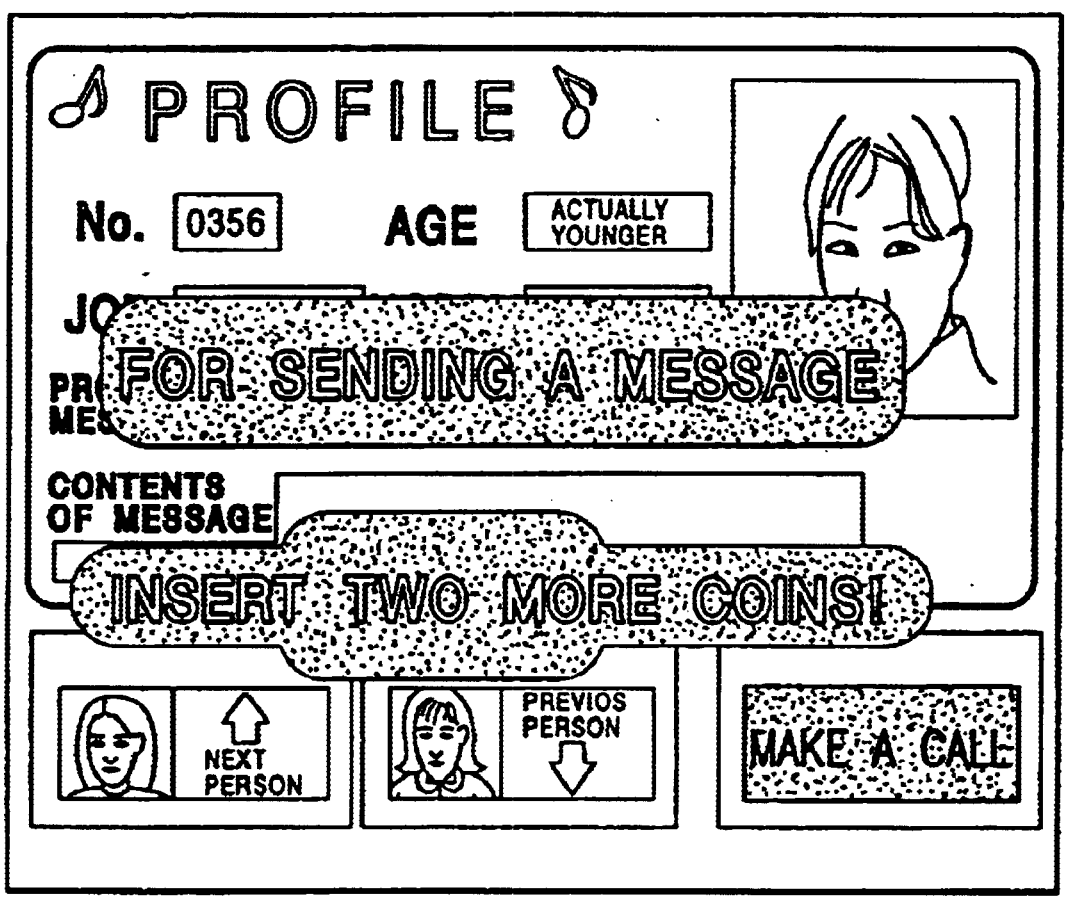
FIG. 34 is an illustration of a game screen for instructing message transmission when a content list of a player's mailbox is displayed.
Figure 35:
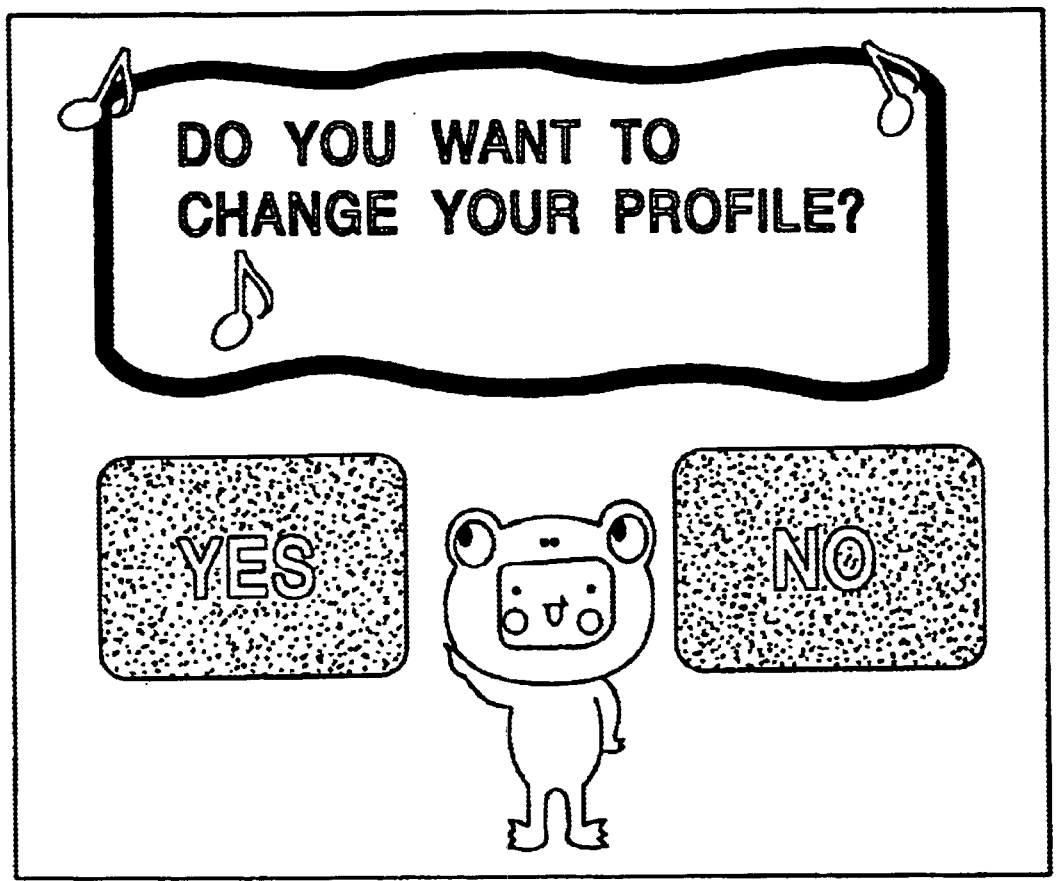
FIG. 35 is an illustration of a game screen for inquiring whether a profile is changed.

After that, by selecting the desired recipient from among the enrollees who failed to establish communication, and touching the "MAKE-A-CALL" icon (step ST137), the game screen shown in FIG. 33 for prompting the player to insert two coins is displayed (step ST139). If no coins are inserted, the Mailbox Check Mode is terminated. If two coins are inserted, the Mailbox Check Mode is terminated (step ST141), and the game screen (shown in FIG. 34) for inquiring whether the profile is changed is subsequently displayed (step ST143). If the profile needs to be changed, the game process jumps to step ST111. If the profile does not need to be changed, the game process jumps to step ST81 for preparing to send a reply.

Figure 9:
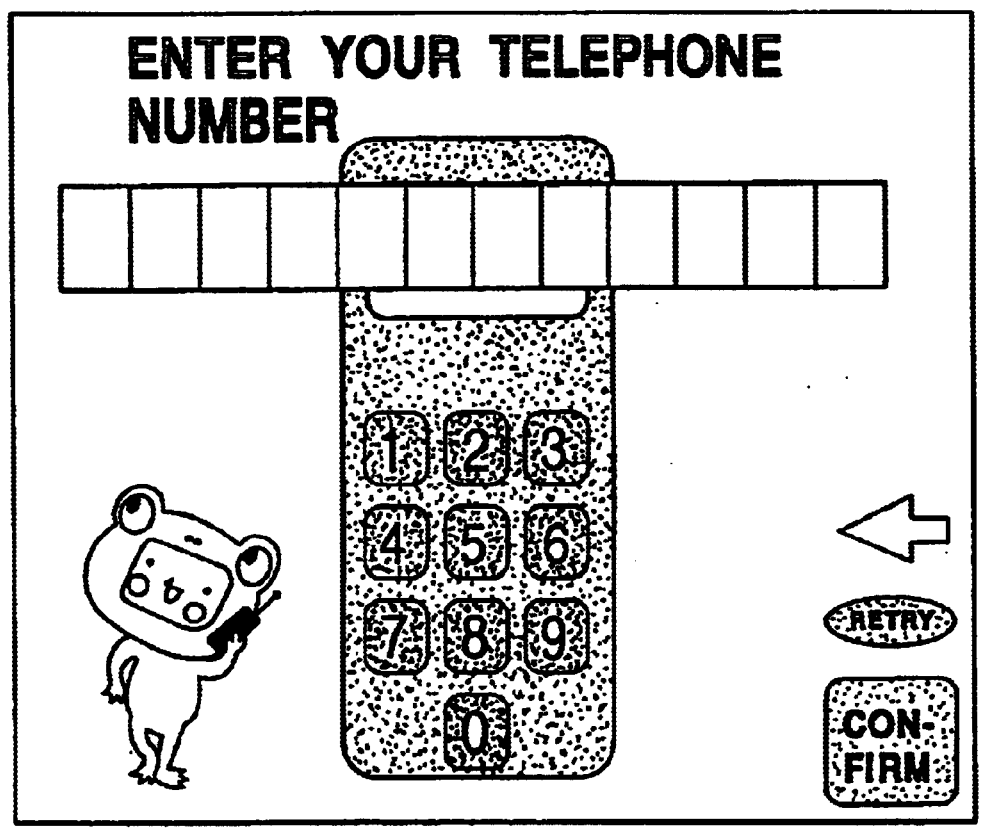
FIG. 9 is an illustration of a player's telephone-number entering screen.

The character-string storage unit in the ROM 101 stores audio signals corresponding to different parlance patterns set for the messenger game-elements (described below) shown in FIG. 9. The word storage unit and the monosyllabic storage unit may also store audio signal corresponding to parlance patterns set for the messenger-robot game elements (described below) shown in FIG. 25. At this time, the audio synthesizing unit 115 is requested to execute a single process.

Instead of the tablet 4 as an operation unit, a mouse or the like may be used that includes a click unit which displays a cursor in a displayed screen and which moves the cursor while displaying the contents of the cursor position.

In addition, by providing identification information, a plurality of game machines identical to the video game 1 are installed in the same game arcade or in game arcades at different places. However, by providing a data-exchange processor 128 for each game machine, enrollee data stored in a data storage unit 110 may be exchanged (transmitted and received) periodically or as required among the game machines. This enables a game machine having no storage capacity to transfer the storage contents to a data storage unit of another game machine via the telephone unit 6, whereby the storage contents can be stored in the data storage unit, which makes it possible to cope sufficiently with a situation in which the number of enrollees concentrates in a particular game machine. In addition, in the case where a player designates the checking of enrollees in another game machine, the game machine by the player accesses the designated game machine so that the player-used game machine can acquire enrollee data in the data storage unit of the designated game machine, whereby the applicable range of the game can be greatly expanded.

What is claimed is:

1. A message-creating game machine comprising:

storage means for storing character images, said storage means including a first storage unit for storing a plurality of images displaying character strings constituting complete sentences and at least one of a second storage unit for storing a plurality of images displaying character strings constituting words and a third storage unit for storing a plurality of monosyllabic character images;

display means for displaying characters;

character-image-display control means for displaying the character images stored in said storage means on said display means;

selecting means for selecting at least one character image from among the character images displayed on said display means;

message-synthesizing means for synthesizing a message from the selected character image;

game-character display-control means for displaying a plurality of game characters on said display means;

game-character selecting means for selecting a game character from among the game characters displayed on said display means, said message-synthesizing means performing audio synthesizing to compose an audio message in the form of audio signals by means of a particular one of a plurality of parlance patterns corresponding to the selected game character;

a telephone link for transmitting said audio message to a recipient; and a money accepting unit, said game machine being structured to be physically accessible by a user at a public location.

2. A message-creating game machine according to claim 1, further comprising a data storage unit for storing created messages so that the created messages can be read.

3. A message-creating game machine according to claim 1, further comprising:

communication control means;

said telephone link including a telephone unit, said telephone unit including at least an operation unit, said character-image-display control means displaying a telephone-number entering screen;

said communication control means sending a call to a telephone number entered from said operation unit; and said message-synthesizing means outputting the synthesized audio message to said telephone unit.

4. A message-creating game machine according to claim 3, further comprising time-measuring means and transmission-time designating means, wherein said communication control means performs a calling process at a time designated by said transmission-time designating means.

5. A message-creating game machine according to claim 4, further comprising:

identification-information storage means for storing identification information assigned to the entirety of said message-creating game machine; and identification-information adding means for adding the identification information to a message to be transmitted.

6. A message-creating game machine according to claim 4, further comprising communication-disabling means for disabling calling to a specified telephone number.

7. A message-creating game machine according to claim 3, further comprising:

identification-information storage means for storing identification information assigned to the entirety of said message-creating game machine; and identification-information adding means for adding the identification information to a message to be transmitted.

8. A message-creating game machine according to claim 7, further comprising communication-disabling means for disabling calling to a specified telephone number.

9. A message-creating game machine according to claim 3, further comprising communication-disabling means for disabling calling to a specified telephone number.

10. A message-creating method, comprising the steps of:

providing a machine physically accessible by a user in a public location, said machine including a display and storage means for storing character images, said storage means including a first storage unit for storing a plurality of images displaying character strings constituting complete sentences and at least one of a second storage unit for storing a plurality of images displaying character strings constituting words and a third storage unit for storing a plurality of monosyllabic character images;

displaying the character images on said display;

selecting at least one image from among the displayed character images;

displaying game characters of different types, each of said game characters having respective associated parlance patterns;

selecting one game character from among the game characters displayed;

synthesizing an audio message in the form of audio signals using the selected image and a particular one of the parlance patterns associated with the selected game character; and transmitting the audio message to a recipient.

11. A message-creating method according to claim 10, wherein the created messages are stored in a data storage unit so as to be read.

12. A message-creating method according to claim 10, further comprising:

sending a call to an entered telephone number; and the synthesized audio message is transmitted via telephone to a receiver.

13. A message-creating method according to claim 12, wherein a time is measured and a calling process is performed when the measured time reaches a designated transmission time.

14. A message-creating method according to claim 13, wherein identification information is assigned to a message-creating game machine and the identification information is added to a message to be transmitted.

15. A message-creating method according to claim 13, wherein calling to a specified telephone number is disabled.

16. A message-creating method according to claim 12, wherein identification information is assigned to a message-creating game machine and the identification information is added to a message to be transmitted.

17. A message-creating method according to claim 16, wherein calling to a specified telephone number is disabled.

18. A message-creating method according to claim 12, wherein calling to a specified telephone number is disabled.

19. A message-creating game machine comprising:

a main body physically accessible by a user at a public location;

operation means for allowing a game player to operate the game machine at the public location;

storage means for storing character images, said storage means including a first storage unit for storing a plurality of images displaying character strings constituting complete sentences and at least one of a second storage unit for storing a plurality of images displaying character strings constituting words and a third storage unit for storing a plurality of monosyllabic character images;

display means for displaying characters, said display means being mounted on the main body, said operation means being placed over the display means;

character-image-display control means for displaying the character images stored in said storage means on said display means;

selecting means for selecting at least one character image from among the character images displayed on said display means upon operation of said operation means by the game player;

message-synthesizing means for synthesizing a message from the selected character image;

game-character display-control means for displaying a plurality of game characters on said display means;

game-character selecting means for selecting a game character from among the game characters displayed on said display means, said message-synthesizing means performing audio synthesizing to compose an audio message in the form of audio signals by means of a particular one of a plurality of parlance patterns corresponding to the selected game character;

a telephone link for transmitting said audio message to a recipient; and a money accepting unit.

20. A message-creating game machine according to claim 19, wherein said operation means includes a layer of a material having at least one of transparent and translucent properties sheet such that displayed contents on said display means can be adequately viewed therethrough.

21. A message-creating game machine according to claim 20, wherein said operation means further includes a resin-molded structure including a matrix of resistance wires and an electrically conductive layer spaced apart from said matrix, said conductive layer and said matrix being urgeable into contact when finger pressure is applied.

22. A message-creating game machine comprising:

operation means for allowing a game player to operate the game machine physically accessed at a public location;

an image capture unit for capturing an image of the game player as implemented by appropriate operation of the operation means by the game player at the public location;

storage means for storing character images, said storage means including a first storage unit for storing a plurality of images displaying character strings constituting complete sentences and at least one of a second storage unit for storing a plurality of images displaying character strings constituting words and a third storage unit for storing a plurality of monosyllabic character images;

display means for displaying characters;

character-image-display control means for displaying the character images stored in said storage means on said display means;

selecting means for selecting at least one character image from among the character images displayed on said display means;

message-synthesizing means for synthesizing a message from the selected character image;

game-character display-control means for displaying a plurality of game characters on said display means;

game-character selecting means for selecting a game character from among the game characters displayed on said display means, said message-synthesizing means performing audio synthesizing to compose an audio message in the form of audio signals by means of a particular one of a plurality of parlance patterns corresponding to the selected game character;

a telephone link for transmitting said audio message to a recipient; and a money accepting unit.

* * * * *